US008751346B2

(12) United States Patent
Maisonneuve

(10) Patent No.: US 8,751,346 B2
(45) Date of Patent: Jun. 10, 2014

(54) INTERACTIVE FINANCIAL TOOL

(75) Inventor: Reginald Maisonneuve, Atlanta, GA (US)

(73) Assignee: Edea, LLC., Atlanta, GA (US)

( * ) Notice: Subject to any disclaimer, the term of this patent is extended or adjusted under 35 U.S.C. 154(b) by 0 days.

(21) Appl. No.: 13/469,516

(22) Filed: May 11, 2012

(65) Prior Publication Data

US 2013/0006824 A1 Jan. 3, 2013

Related U.S. Application Data

(60) Provisional application No. 61/485,970, filed on May 13, 2011.

(51) Int. Cl.
*G06Q 40/00* (2012.01)
(52) U.S. Cl.
USPC .......................................................... 705/35
(58) Field of Classification Search
None
See application file for complete search history.

(56) References Cited

U.S. PATENT DOCUMENTS

| 3,764,063 | A | * | 10/1973 | Siegel | 235/61 E |
| 8,423,445 | B2 | * | 4/2013 | Rotenberg | 705/36 R |
| 2001/0011242 | A1 | * | 8/2001 | Allex et al. | 705/36 |
| 2005/0174893 | A1 | * | 8/2005 | Remont | 368/127 |
| 2007/0244775 | A1 | * | 10/2007 | Linder | 705/35 |

OTHER PUBLICATIONS

Bontis et al.; The Knowledge Toolbox: A Review of the Tools Available to Measure and Manage Intangible Resources; European Management Journal; vol. 17, No. 4, pp. 391-402; (1999).*
Hao-Chen Huang; Designing a Knowledge-Based System for Strategic Planning: A Balanced Scorecard Perspective; Expert Systems with Applications; vol. 36, pp. 209-218; (2009).*
I. M. Pandey; Balanced Scorecard: Myth and Reality; Vikalpa; vol. 30, No. 1; (Jan.-Mar. 2005).*

* cited by examiner

*Primary Examiner* — Virpi Kanervo
(74) *Attorney, Agent, or Firm* — Baker & Hostetler LLP

(57) ABSTRACT

Discussed herein is an evaluation and scoring system that may be used to quickly assess and guide financial decisions, facilitate or create communities of interest, and assist in accessing markets and/or consumers that may not have been sufficiently considered before.

15 Claims, 23 Drawing Sheets

| Premium | Advocate | Personal | Basic |
|---|---|---|---|
| $5/month | $5/month | $5/month | free |
| [SIP] | [SIP] | [SIP] | [SIP] |
| Best for users with complex financial needs | Best for Users seeking credit standing | Tools & support to navigate financial life | Want to know where you stand financially |
| Automated Account Setup | Automated Account Setup | Automated Account Setup | Automated Account Setup |
| Quarterly Accreditation (20 accounts) | Semi-Annual Accreditation (15 accounts) | Semi-Annual Accreditation (10 accounts) | Access to services directory |
| Individualized Loan & Credit Advocacy | Individualized Loan & Credit Advocacy | Member Linking / Family Planning | Self-service Maintenance |
| Document Management | Dispute Management | Product & Service Matching to improve finances | More |
| 3 Hours of Financial Advisory Services with a Personal IFA | 2 Hours of Financial Advisory Services with a Personal IFA | More | |
| AliasMail | AliasMail | | |
| More | More | | |

Messages 1202

Select All | Select None | Delete Selected

| | Sender | | Subject | Date |
|---|---|---|---|---|
| ☐ | Charles Mink - Chase Bank | | RE: Saving for college | Today - 5:52pm |
| ☐ | Gloria Hansworth - Seattle Financial | 📎 | Financial help is available in your area! | 10/29/10 11:15pm |
| ☐ | Dave Morgan - Amex Bank | 📎 | RE: Saving for daughter's college | 10/29/10 11:15pm |
| ☐ | Micheal Talisco - ING Direct | | New savings opportunities available for you... | 10/29/10 11:15pm |
| ☐ | Tina Gupta - Loan Consolidators, Inc. | | Consolidate your loans and get down to 4.5%! | 10/29/10 11:15pm |
| ☐ | Shari Merced - Discover | | Based on your scores, new low rates! | 10/29/10 11:15pm |
| ☐ | Peter Finch - Diners Club | | Follow up | 10/29/10 11:15pm |

Figure 12

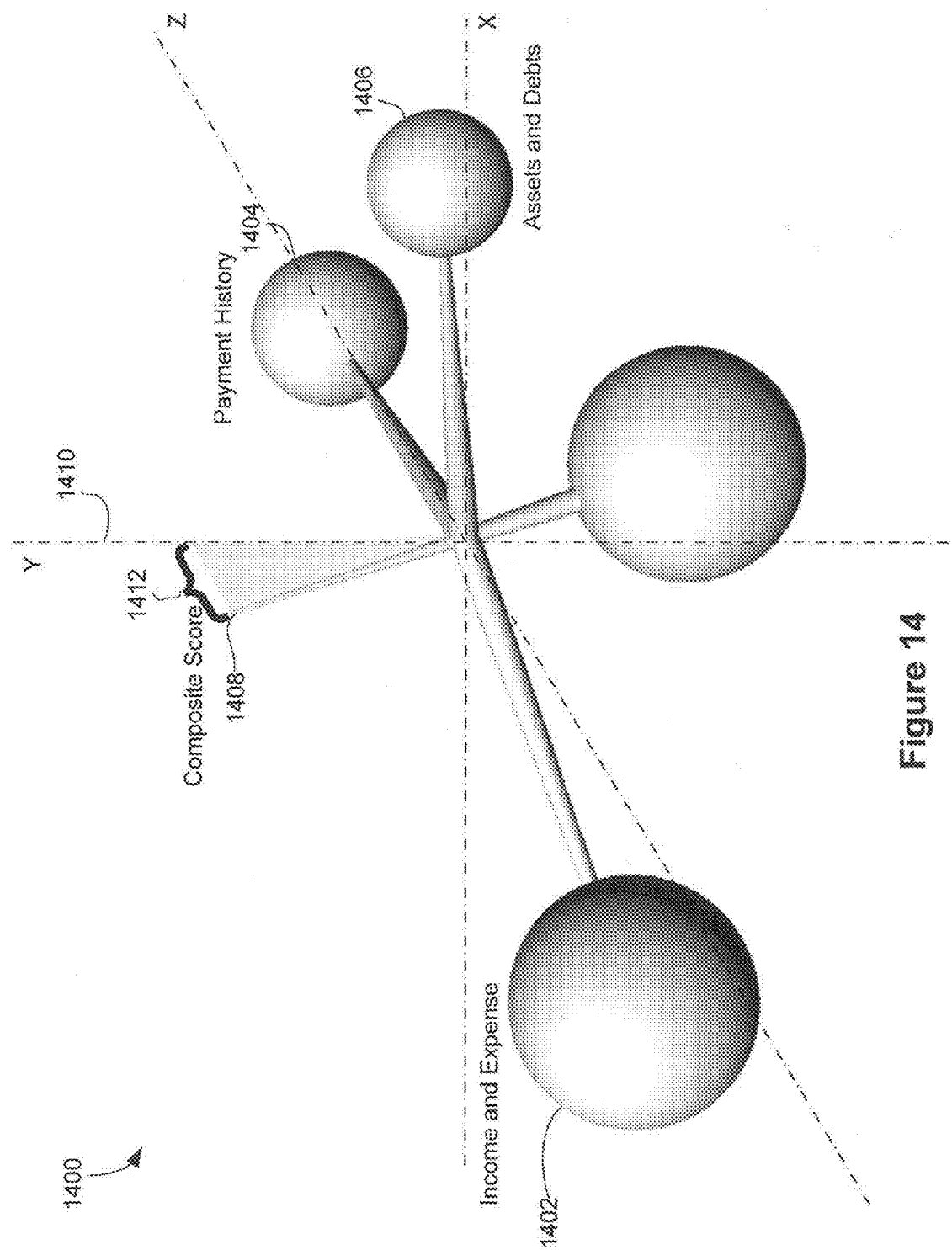

|  | 1502 |  | 1504 |
|---|---|---|---|
| Enterprise | Business | Professional | Transactional |
| $215/month | $120/month | $75/month | Unit Costs |
| SetUp | SetUp | SetUp | SetUp |
| Active eMarketing | Moderate Client Volumes | Regional Services | Occasional Inquiries |
| Automated Account Setup | Automated Account Setup | Automated Account Setup | Self-Service Maintenance |
| 60 AliasMails / month 4 Simultaneous Users | 30 AliasMails/month 3 Unique Users | 50 AliasMails/month 5 Simultaneous Users 100 Inquiries/month | Pay Per Inquiry |
| Enhanced Database | Member Management | Member Filtering | Services Directory |
| Advanced MTP Dashboard | Advanced MTP Dashboard | Professional Dashboard | |
| Directory Listing | Directory Listing | Directory Listing | |
| Member Account Detail | Member Account Detail | Member Account Detail | |
| Discounts | | | |
| Priority Page Presentation | | | |
| more | more | more | more |

Figure 16

INTERACTIVE FINANCIAL TOOL

CROSS-REFERENCE TO RELATED APPLICATION

This application claims priority to U.S. Provisional Patent Application No. 61/485,970, filed May 13, 2011, the contents of which is incorporated herein by reference in its entirety.

TECHNICAL FIELD

The present invention relates to computer systems and methods for financial management.

BACKGROUND

Generally, personal finance is a stressful topic for many people. Most people want to get ahead financially and desire stability, but many people do not feel equipped to make the right decisions. Financial health may be described as the state of a person's or business's finances and may be assessed based on how financial decisions have been and will be made. For example, financial health may be assessed by determining how well people are living within their means, building for the future, and living up to obligations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

A scoring system may promote understanding and decision making, enable the development of a personal financial brand and provide for other systems, tools, metrics, and methods that may guide financial decisions, facilitate or create communities of interest, and assist in accessing markets and/or consumers that may not have been sufficiently considered before. In an embodiment, a processor may be configured to analyze data comprising financial data and determine a first financial metric based on the analysis of the data. A display may receive instructions to display a balance that tilts based on the processor determined financial metric.

BRIEF DESCRIPTION OF THE DRAWINGS

A more detailed understanding may be had from the following description, given by way of example in conjunction with the accompanying drawings wherein:

FIG. 2 displays an exemplary pricing and sign-up screen;
FIG. 4 displays an exemplary registration screen;
FIG. 12 displays an exemplary messaging screen;
FIG. 14 displays an exemplary three-arm balance according to one or more disclosed embodiments of a financial health tool;
FIG. 16 displays an exemplary pricing and sign-up screen for an advertiser.

DETAILED DESCRIPTION OF ILLUSTRATIVE EMBODIMENTS

Figure 1:
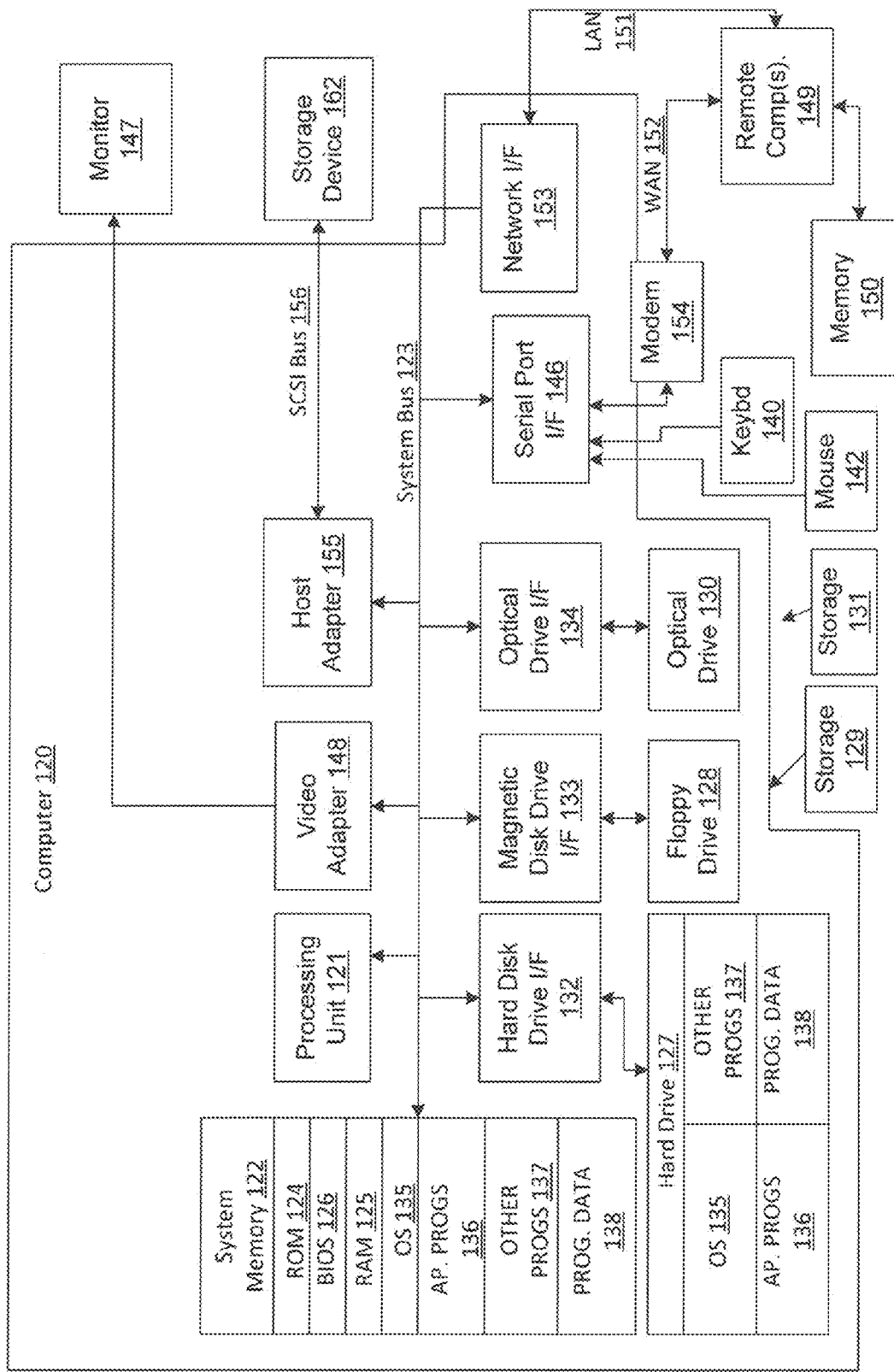
FIG. 1 is an exemplary block diagram representing a general purpose computer system in which aspects of the present invention and/or portions thereof may be incorporated.

FIG. 1 and the following discussion are intended to provide a brief general description of a suitable computing environment in which the present invention and/or portions thereof may be implemented. Although not required, the invention is described in the general context of computer-executable instructions, such as program modules, being executed by a computer, such as a client workstation, server or personal computer. Generally, program modules include routines, programs, objects, components, data structures and the like that perform particular tasks or implement particular abstract data types. Moreover, it should be appreciated that the invention and/or portions thereof may be practiced with other computer system configurations, including hand-held devices, multiprocessor systems, microprocessor-based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

FIG. 1 is a block diagram representing a general purpose computer system in which aspects of the present invention and/or portions thereof may be incorporated. As shown, the exemplary general purpose computing system includes a computer 120 or the like, including a processing unit 121, a system memory 122, and a system bus 123 that couples various system components including the system memory to the processing unit 121. The system bus 123 may be any of several types of bus structures including a memory bus or memory controller, a peripheral bus, and a local bus using any of a variety of bus architectures. The system memory includes read-only memory (ROM) 124 and random access memory (RAM) 125. A basic input/output system 126 (BIOS), containing the basic routines that help to transfer information between elements within the computer 120, such as during start-up, is stored in ROM 124.

The computer 120 may further include a hard disk drive 127 for reading from and writing to a hard disk (not shown), a magnetic disk drive 128 for reading from or writing to a removable magnetic disk 129, and an optical disk drive 130 for reading from or writing to a removable optical disk 131 such as a CD-ROM or other optical media. The hard disk drive 127, magnetic disk drive 128, and optical disk drive 130 are connected to the system bus 123 by a hard disk drive interface 132, a magnetic disk drive interface 133, and an optical drive interface 134, respectively. The drives and their associated computer-readable media provide non-volatile storage of computer readable instructions, data structures, program modules and other data for the computer 120.

Although the exemplary environment described herein employs a hard disk, a removable magnetic disk 129, and a removable optical disk 131, it should be appreciated that other types of computer readable media which can store data that is accessible by a computer may also be used in the exemplary operating environment. Such other types of media include, but are not limited to, a magnetic cassette, a flash memory card, a digital video or versatile disk, a Bernoulli cartridge, a random access memory (RAM), a read-only memory (ROM), and the like.

A number of program modules may be stored on the hard disk, magnetic disk 129, optical disk 131, ROM 124 or RAM 125, including an operating system 135, one or more application programs 136, other program modules 137 and program data 138. A user may enter commands and information into the computer 120 through input devices such as a keyboard 140 and pointing device 142. Other input devices (not shown) may include a microphone, joystick, game pad, satellite disk, scanner, or the like. These and other input devices are often connected to the processing unit 121 through a serial port interface 146 that is coupled to the system bus, but may be connected by other interfaces, such as a parallel port, game port, or universal serial bus (USB). A monitor 147 or other type of display device is also connected to the system bus 123 via an interface, such as a video adapter 148. In addition to the monitor 147, a computer may include other peripheral output devices (not shown), such as speakers and printers. The exemplary system of FIG. 1 also includes a host adapter 155, a Small Computer System Interface (SCSI) bus 156, and an external storage device 162 connected to the SCSI bus 156.

The computer 120 may operate in a networked environment using logical connections to one or more remote computers, such as a remote computer 149. The remote computer 149 may be a personal computer, a server, a router, a network PC, a peer device or other common network node, and may include many or all of the elements described above relative to the computer 120, although only a memory storage device 150 has been illustrated in FIG. 1. The logical connections depicted in FIG. 1 include a local area network (LAN) 151 and a wide area network (WAN) 152. Such networking environments are commonplace in offices, enterprise-wide computer networks, intranets, and the Internet.

When used in a LAN networking environment, the computer 120 is connected to the LAN 151 through a network interface or adapter 153. When used in a WAN networking environment, the computer 120 may include a modem 154 or other means for establishing communications over the wide area network 152, such as the Internet. The modem 154, which may be internal or external, is connected to the system bus 123 via the serial port interface 146. In a networked environment, program modules depicted relative to the computer 120, or portions thereof, may be stored in the remote memory storage device. It will be appreciated that the network connections shown are exemplary and other means of establishing a communications link between the computers may be used.

Computer 120 may include a variety of computer readable storage media. Computer readable storage media can be any available media that can be accessed by computer 120 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 120. Additionally, any storage techniques used in connection with the applicable embodiments herein may invariably be a combination of hardware and software Contemplated herein are methods, apparatuses, and systems to evaluate and guide individuals or businesses regarding financial matters and the like. The methods, apparatuses, and systems may include a scoring system to promote a personal financial brand and other methods, apparatuses, and systems that may guide financial decisions, facilitate or create communities of interest, and reduce economic friction. The embodiments disclosed herein may bring individuals, businesses, and other organizations together by creating, recognizing or better serving common interests or an opportunity to interact that may not be adequately or as well served as they potentially could be. In addition, the cost of doing business, offering services, or identifying and accessing services may be reduced (e.g., reduced economic friction). The cost is not necessarily just in dollar terms, but may be regarding the level of difficulty for potentially mutually interested parties to engage in business.

FIG. 2 displays an exemplary pricing and sign-up screen. The pricing and sign-up screen may display different available subscription levels for individuals, businesses, or other entities to begin their sign-up to become members. For example, as shown in FIG. 2, there may be a premium level, advocate level, personal level, and basic level. Each level may carry different levels of customization and access to features. For example, basic level may include services such as unlimited access to an MTP score (e.g., financial health score), access to a services directory, and self-service maintenance, while advocate level may consist of features such as automated account setup, semi-annual accreditation for up to 15 accounts, individual loan and credit advocacy, dispute management, two hours of financial advisory services with a personal investment financial advisor, and alias mail. For example, once an individual chooses a service level and fills out personal information they may become a member.

Figure 3:
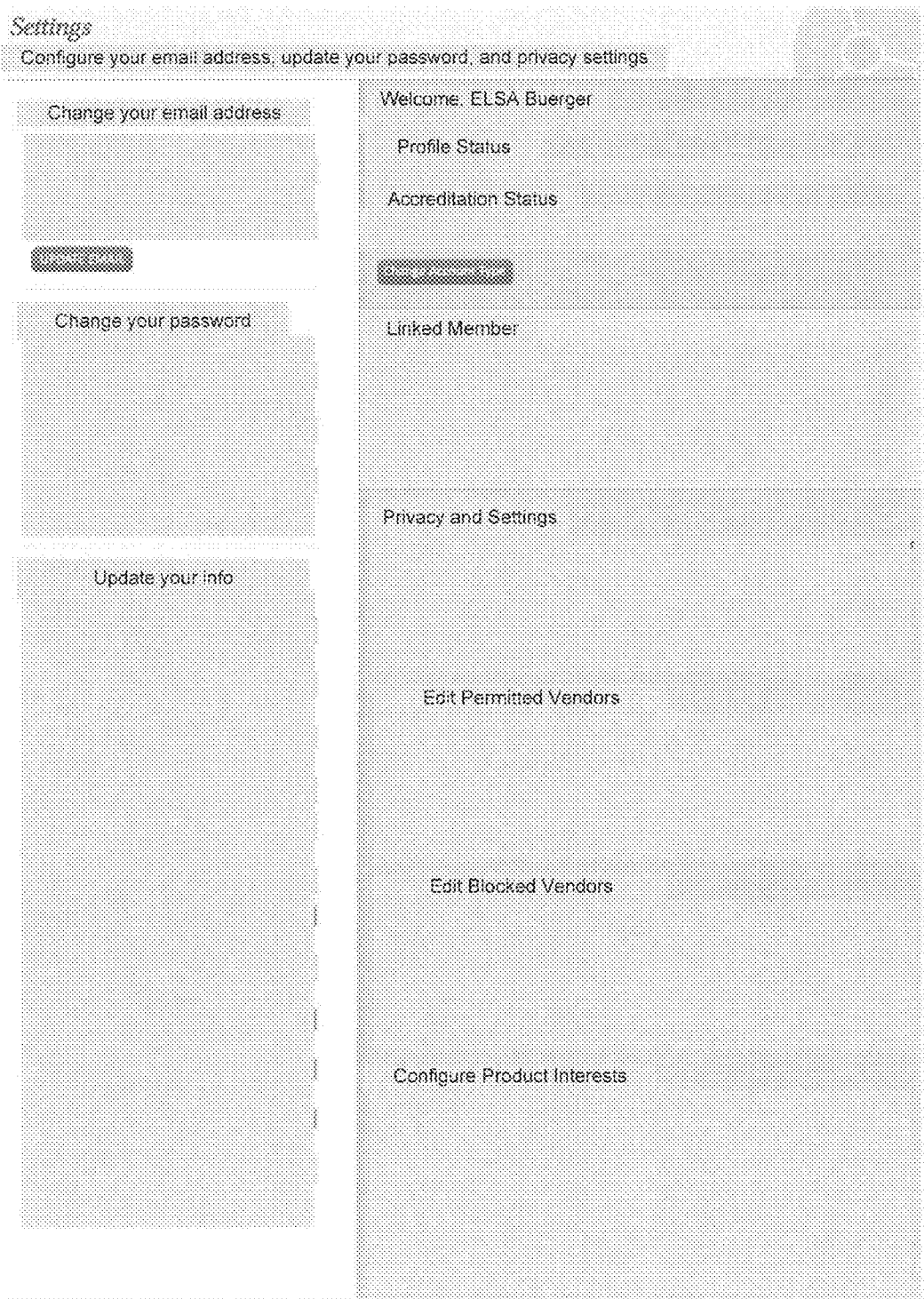
FIG. 3 displays an exemplary profile and settings screen.
Figure 4:
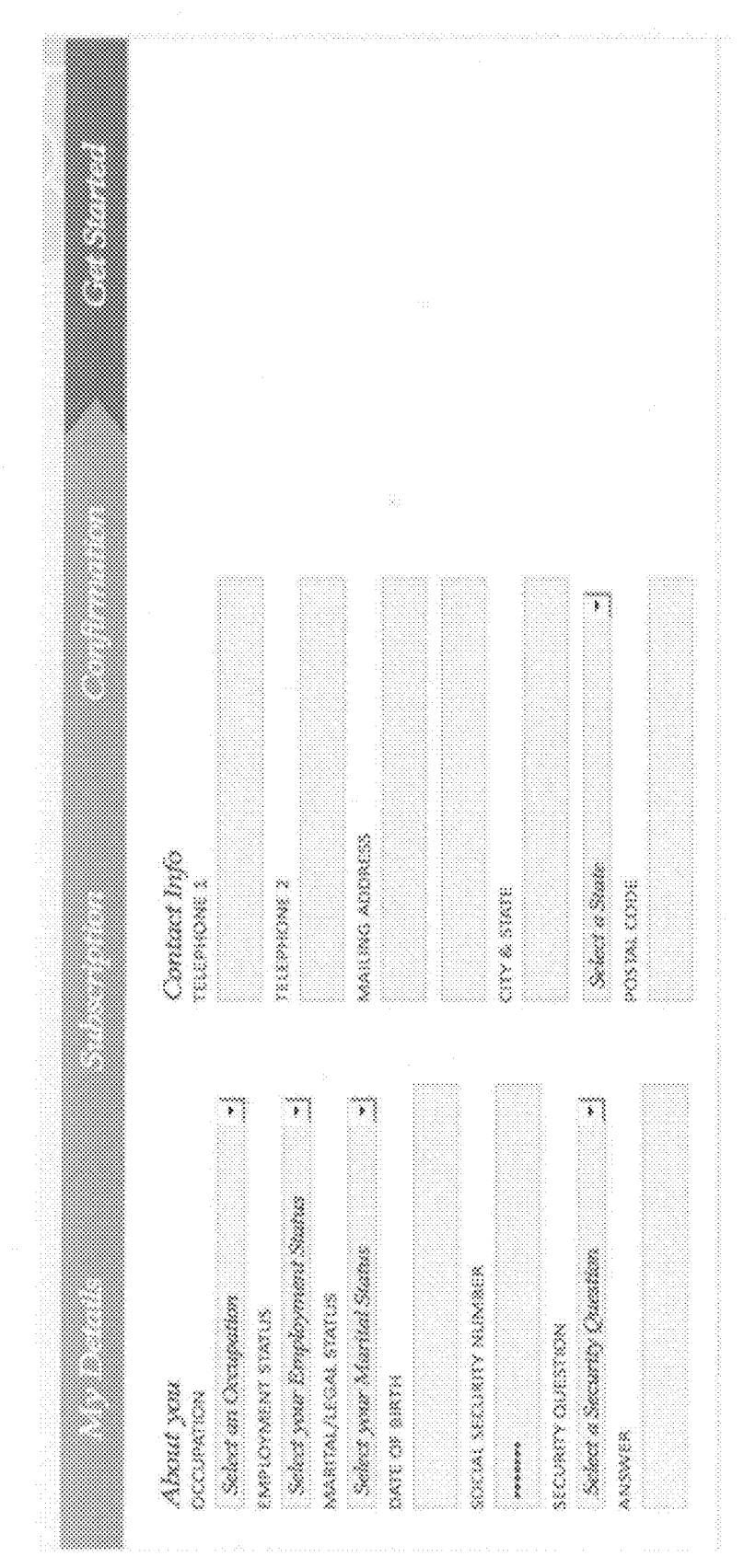

FIG. 3 displays an exemplary profile and settings screen. The settings screen may allow for the update of an e-mail address, a password and other personally identifiable information. The settings screen may allow for the change of an accreditation status, a linked member status, and privacy and advertising settings status, among other things. FIG. 4 displays an exemplary registration screen where a user may put in personally identifiable and other information. This screen may be seen during the initial set-up of an account and during subsequent modifications of the account.

Figure 5:
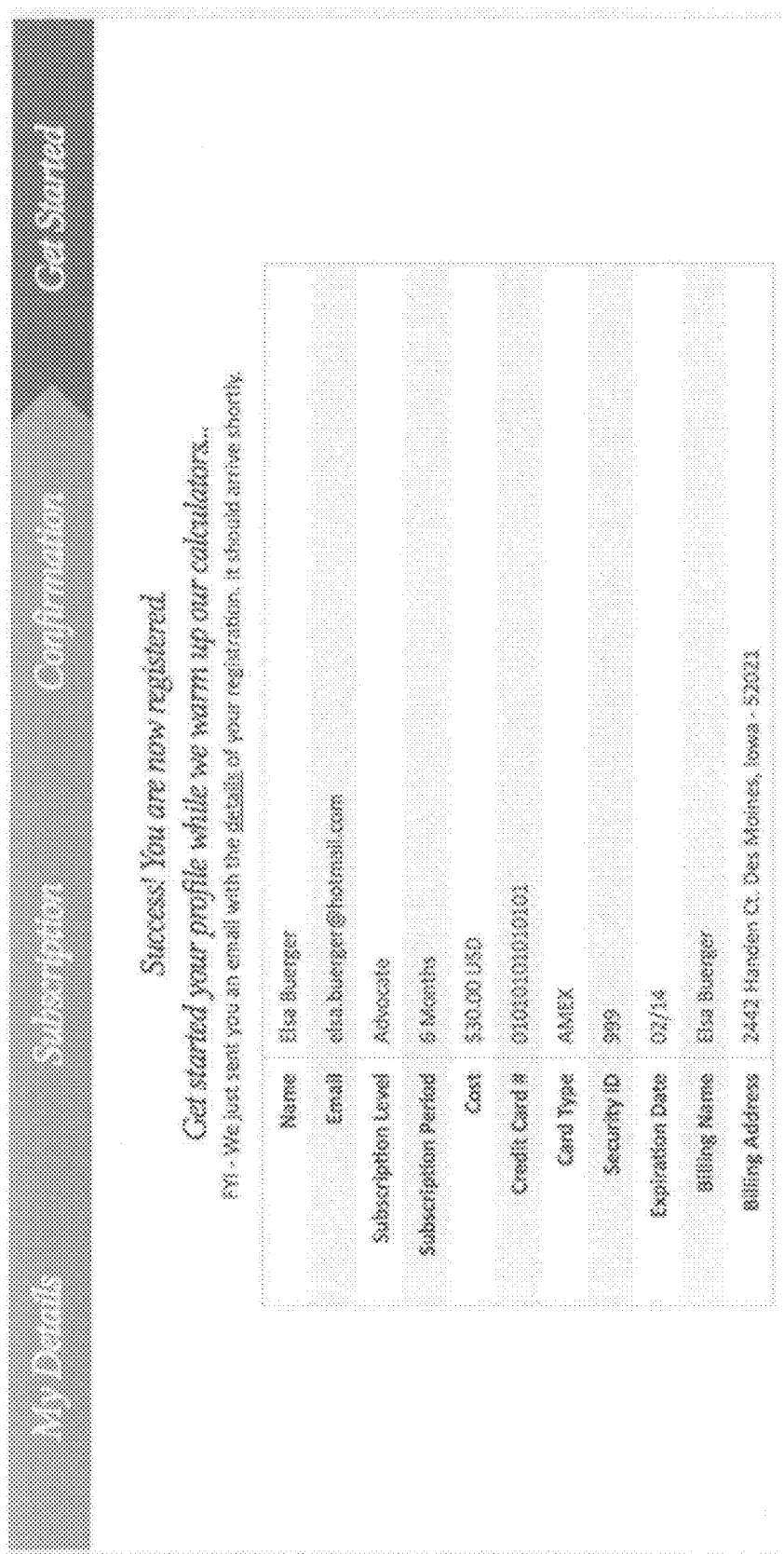
FIG. 5 displays an exemplary registration screen.
Figure 6:
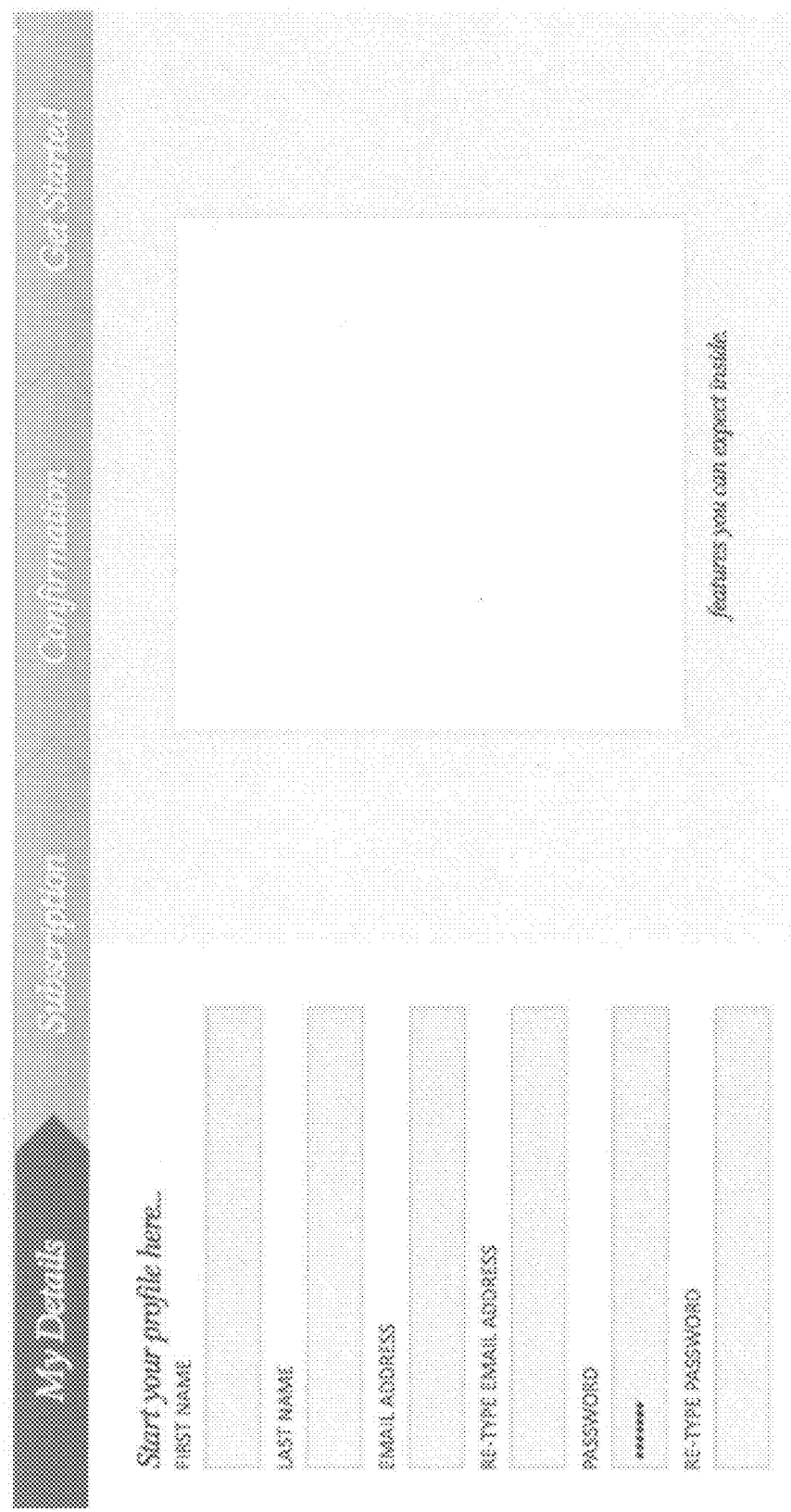
FIG. 6 displays an exemplary registration screen.

FIG. 5 displays an exemplary registration screen. The screen may show information such as the member name, member e-mail, the subscription period, and the cost of subscription, among other things. FIG. 6 displays an exemplary registration screen. As shown in FIG. 6, the screen may have places to insert a name, e-mail address, and password information.

Figure 7:
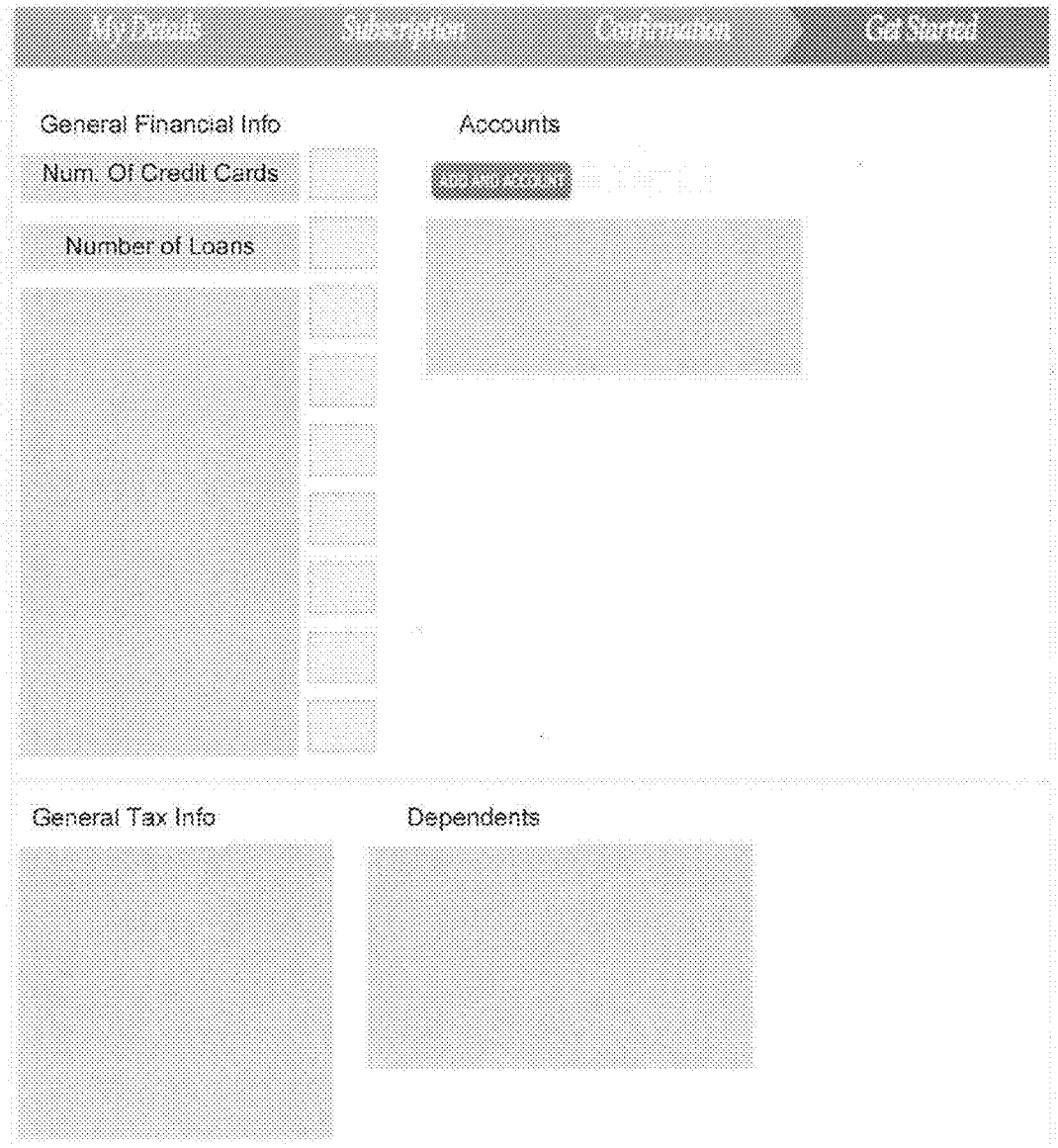
FIG. 7 displays an exemplary registration screen.

FIG. 7 displays an exemplary registration screen. As shown in FIG. 7, there may be boxes that accept general financial information such as number of credit cards, number of loans, number of tax liabilities, number of alimony payments, and the like. There also may be boxes for general tax information including estimated local tax bracket, number of dependents, and the like.

As discussed herein, a financial health scoring system may be used to assist a member in assessing financial health. Although the financial health scoring system may use multiple sources to obtain, maintain and analyze financial data, the financial health scoring system may be considered different from popular credit scoring systems. Prior art credit scoring systems typically focus on payment history, credit card usage, and credit inquiries, and may be considered a narrow measure of statistical risk to creditors and may be misinterpreted as a measure of financial health or as a guide to sound financial decision making by both individuals and organizations.

The financial health scoring system described herein may be considered a measure or metric of financial health for members or organization to have an intuitive way for to assess an individual's, couple's, family's, organization's, or social unit's financial condition and needs as well as broader market needs and opportunities. Members as discussed herein may be considered individual consumers, businesses, and other entities. For example, the disclosed financial health scoring system may show how well a member lives within the member's means, builds wealth, and meets the member's obligations, with each having its own component score in addition to a composite score showing overall health. The imbalance or resultant "tilt" of these scores in the physical representation of the scoring model may convey information about where an individual is strong or weak and what they can do to improve their condition. The financial health scoring system may be considered more responsive to changes in a member's financial profile in relations to other scoring systems because it may look at a member's historical as well as current information. For example, a raise in salary may immediately affect a member's financial health score. An example range of the scoring system may be from 0 to 1000 and may also have grades of A, B, C, D, and F. The scores and grades may also be color coded to further assist in interpreting what may be considered bad and good scores.

Member data may be used to create financial health evaluations for different categories. The financial health scoring system may include the following prongs: 1) income and expenses, which may be used to determine if a member is living within his means; 2) debts and assets, which may be used to determine how well a member is building and protecting wealth; and 3) payment history and behavior which may be used to determine a member's performance in meeting his financial obligations. Each prong may be scored separately to determine how well a member is doing in each area. There also may be a composite financial health score which may show how a member is doing overall. The multiple prongs and the overall score (i.e., composite score) may be aligned with the concept of balance, as discussed herein. The composite score may be an indication of how well a member is managing (i.e., balancing) all of his financial affairs.

Figure 8A:
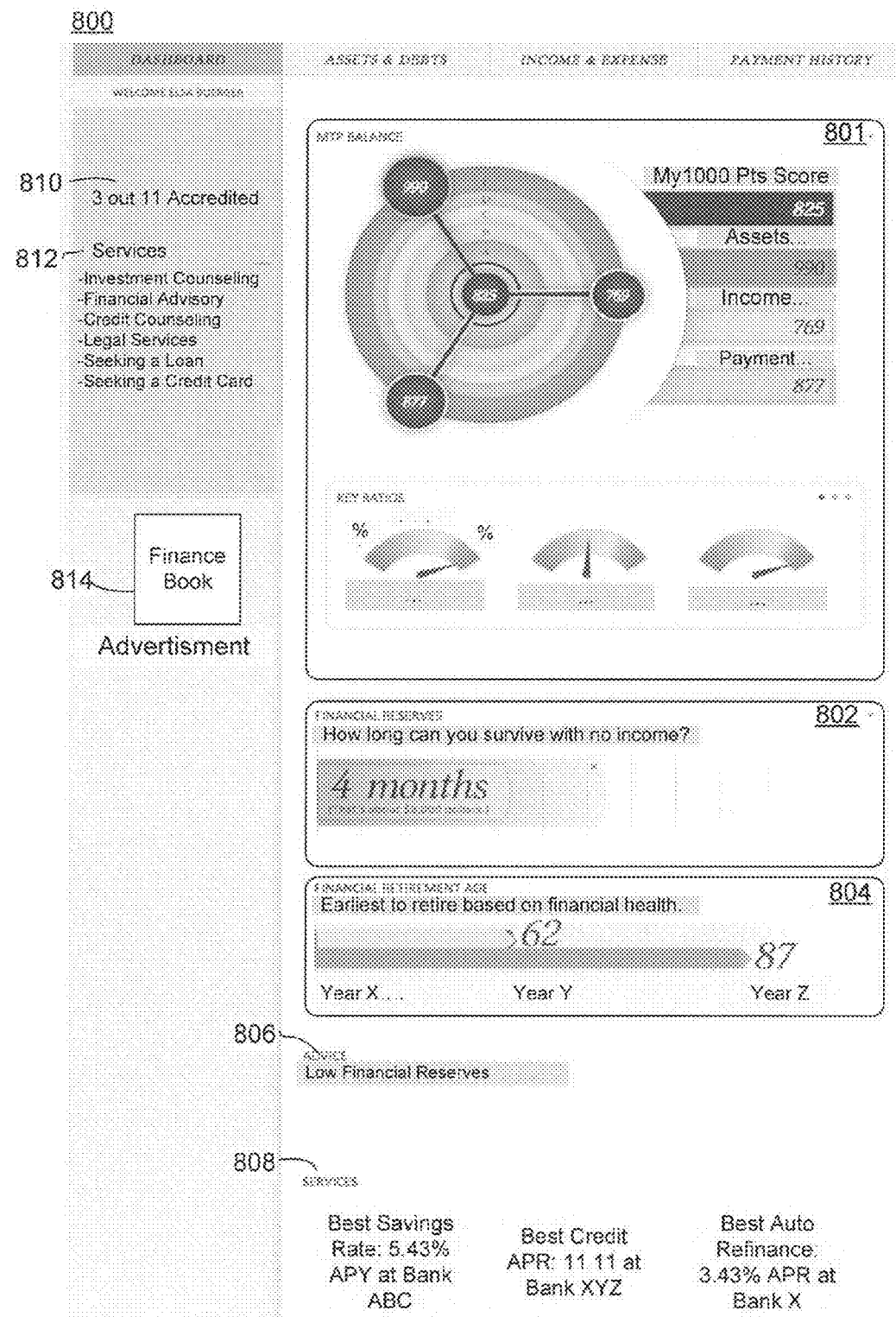
FIG. 8A displays an exemplary dashboard screen.

FIG. 8A displays an exemplary dashboard screen. The dashboard screen 800 may comprise a balance section 801. The balance section 801 may display a list of different financial health scores and graphical representations of the scores positioned on a financial health score balance. The dashboard screen 800 may have a financial reserves section 802. The financial reserves section 802 may have a financial reserve graphic and other information, which may display how long a member may maintain his current standard of living if the member had no further income. The dashboard screen 800 may have a financial retirement section 804. The financial retirement section 804 may have a debt free graphic and a financial retirement graphic. The debt free graphic may estimate how many years it will take for a member to pay off debt based on his information. The retirement age graphic may estimate how many years it will take for a member to retire based on his information. Complimentary dashboards focused on different dimensions of financial performance or behavior may also be introduced with metrics targeted for their relevance, utility, and emotive significance to the member such as a "Funded Living Performance," metric which may provide an individual with an indication of the level to which he is relying on debt to sustain his lifestyle and the degree to which he is or is not living within his means and needs.

In FIG. 8A, there may be an advice section 806 that is responsive to an individual's financial situation, objectives, or needs and an advertisement section 808 that is similarly responsive. The advice section 806 may be based on member information entered by the member or automatically gathered from member accounts and member interactions with the financial health system. The services section 808 may be based on a member's composite and other scores or diagnostic metrics. The services section 808 may present services to the member that are intended to improve his financial health score(s) and, in turn, a member's general financial health. There may be information displayed under the services section 808 with regard to how the service may impact the composite score, the income and expenses score, assets and debts score, and/or payment history score, for example. The effect on a score may be displayed numerically or with a graphic (e.g., a green arrow). Alternatively, for example, the top 3 services based on composite score or other statistics may be displayed which may be set by a member. At 814 advertisements may be based on an advertiser wanting to reach a person with a certain score, other metrics, or other relevant factors. To further clarify, at 808 the services may be pulled to the member's screen based on the member setting an option to display services that may improve the member's score and other statistics. While at 814, advertisements may be pushed to the user based on the advertiser's selection of specific individual accounts that have particular scores or other statistics or accounts that fit general parameters selected by the advertiser. FIG. 8A may also show additional services 812 and accredited accounts progress 810.

Figure 8B:
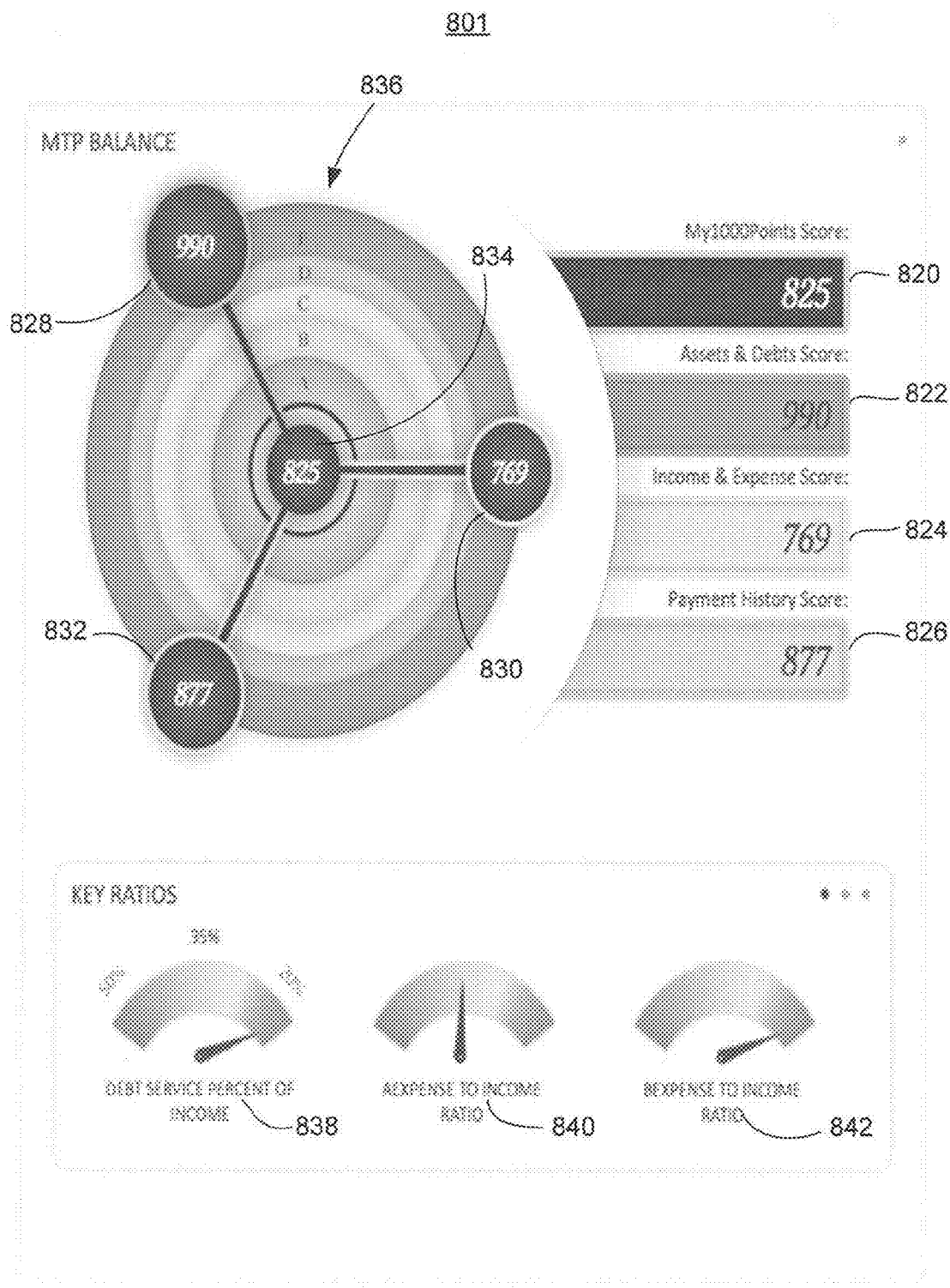
FIG. 8B is a view of an exemplary balance section.

FIG. 8B is a view of exemplary balance section 801. There is a composite score 820. As shown in FIG. 8B, there may be other financial health scores such as an Assets & Debts score 822, an Income & Expense score 824, and a Payment History score 826. The composite score 820 (along with other scores) may be based on a members particular goals and/or situation (e.g., a member's age, whether in or out of college, number of years out of college, region of the country, number of kids, type of business, etc.). There may also be a score or grade to represent the degree to which an individual's financial management performance is "in" or "out of" balance. There may also be ratios that may be graphically represented. For example, there may be indicators for Debt Service Percent of Income 838, A-Expense to Income Ratio 840, and B-Expense to Income Ratio 842.

A member's financial health may also be displayed graphically, such as the three-arm balance as shown in FIG. 8B. At 836 there may be a three-arm balance in conjunction with concentric circles that are color coded (e.g., shades of green, yellow, and red) and labeled with grades (e.g., A, B, C, D, and F) to show how well a member is managing financial affairs and where the opportunities are to improve the management of financial affairs. The composite score 834 may be considered an overall score. The other scores at 828, 830, and 832 may be considered as weighted arms balanced on/near the point of 834. The balance graphic 836 may be seen as representing quantifiably, visually, simply and pragmatically a simplistic and prompt way to show how well a member is managing their financial lives, which may consist of information regarding where the member is strong, where the member is weak, and what the member can do to improve his financial situation. The 3-arm balance and the principles underlying it may provide a mechanical representation (a virtual machine) of complex financial factors and their interaction to which a person may relate and use to enhance decisions. This model may give a business a tool to identify and serve individuals or entities (e.g., members) who can best benefit from a business' products and services. "Balance" in this model may be a component of scoring that quantifies how well a member is achieving balance in his financial life.

Figure 9:
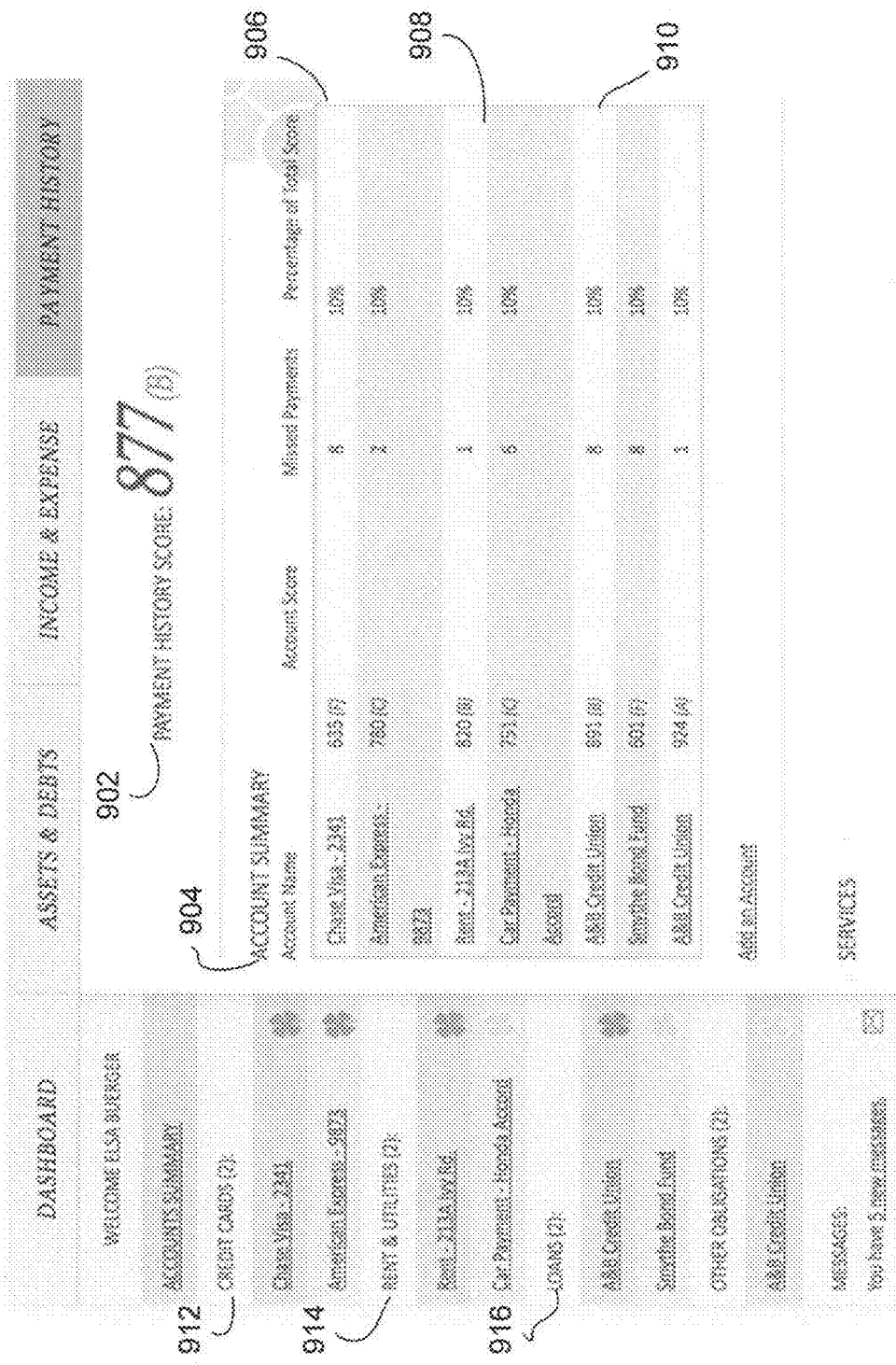
FIG. 9 displays an exemplary payment history screen.

FIG. 9 displays an exemplary payment history screen. At 902 there may be a composite payment history score and grade. There may be an account summary 904 which has a listing of different accounts, which may be credit card accounts 912, rent and utilities accounts 914, loans 916, and the like. The summary category (e.g., credit cards 912) and/or a member account (e.g., 906) may each have a score as well. For example, at 906 a Chase Visa has an F grade with a score of 635, at 908 Rent has a B grade with a score of 820, and at 910 A&B Credit Union has a B grade with a score of 891. The account summary scores 904 may contribute a certain percentage of the composite payment history score 902.

Figure 10:
FIG. 10 displays an exemplary income and expense screen.
Figure 11:
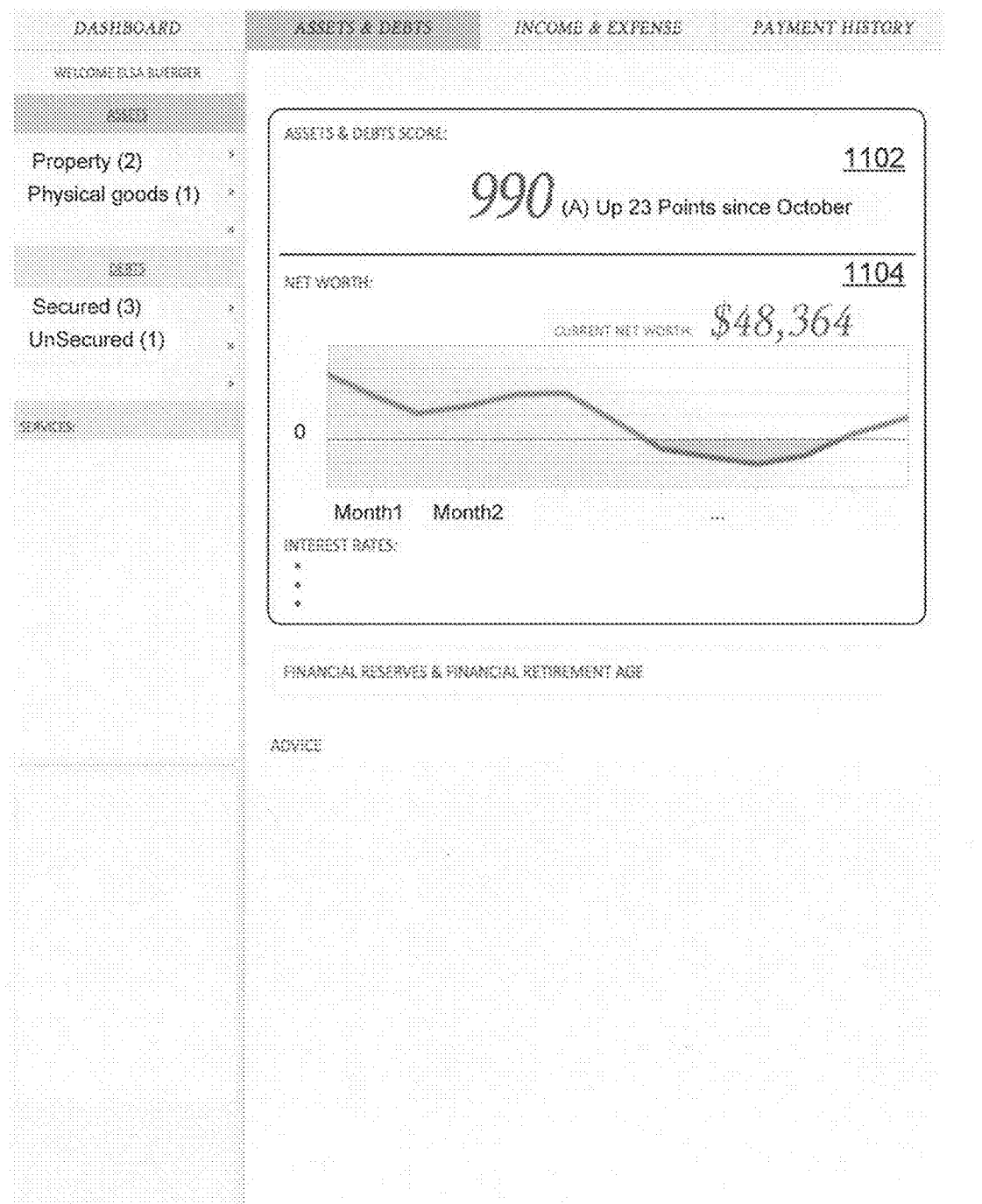
FIG. 11 displays an exemplary assets and debts screen.

FIG. 10 displays an exemplary income and expense screen 1000. At 1002 there may be an income and expense section with an income and expense score and grade. The income and expense section 1002 may also display the points the score declined or increased in a particular time frame. There may be a net income section 1004 which may show income and expense in a graph form and also list expenses over a particular date range. There also may be an ability to accredit an account 1006 and an account summary 1008. FIG. 11 displays an exemplary assets and debts screen. At 1102, there may be an assets and debts section with an assets and debts score. There may be a net worth section 1104 which may show net worth in a graph form and also list interest rates.

FIG. 12 displays an exemplary messaging screen 1202. The messaging screen 1202, for example, may be overlaid on another screen and/or may be a pop-up window. At 1202 there may be several messages. For example, the messages may be personal messages from friends or family members and service advertisement or offer messages based on a member's account information. The messaging system may also be used by the member to securely and anonymously share information through an alias with banks and other entities that the member wishes to explore services with. The underlying messaging system may allow for secure access to a member's account information while protecting personally identifiable information. For example, a member may choose to share certain information about himself, while protecting the member's privacy, in order to assess or be assessed by a prospective service provider. The member can reveal his identity when and if he deems fit.

Figure 13:
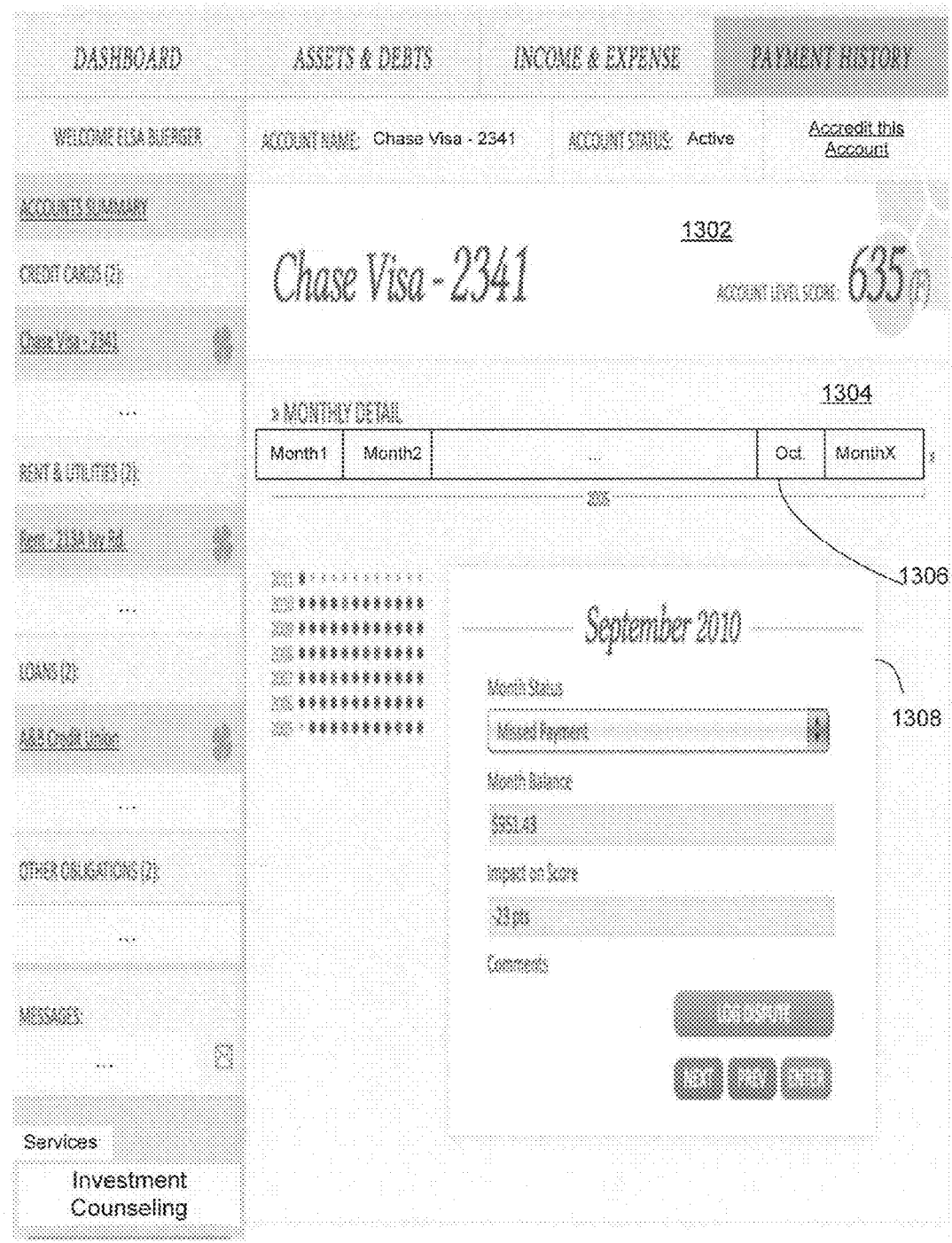
FIG. 13 displays an exemplary detailed account screen.

FIG. 13 displays an exemplary detailed account screen. At 1302, the account name and the account level score may be displayed. At 1304, a monthly detail may be displayed. The months may be color coded to display a negative, positive, or neutral impact on the account level score. For example, the month of October 1306 may be colored red which may be interpreted as a negative impact on the account level score. There may be a month detail section 1308 which may have more account detail for a particular month and may numerically or graphically display how the account performance during a particular month may have positively or negatively impacted a member's score. The individual may also log a dispute about the status of a particular month.

FIG. 14 displays a three-arm balance 1400, similar to what was shown in FIGS. 8A and 8B. As conveyed herein, there may be an Income and Expense Arm 1402, a Payment History arm 1404, and an Assets and Debts arm 1406. Each arm and corresponding ball may have different scores, which may be a letter, a number, or combination of letters and numbers. The balls or arms may be displayed using different colors (e.g., shades of green, yellow, and red). The scores and colors may be based on financial information, age, and other data. There may also be a raw score which may correspond to a central point 1408. When the three-arm balance component scores 1402, 1404, or 1406 change, 1408 may also change, and the raw score point 1408 may move away from or towards the vertical line 1410 (which may indicate the center) and the angle 1412 may increase or decrease. The tilt of the three-arm balance may be configured in a way that three-arm balance may tilt in any direction in space. The three-arm balance component scores 1402, 1404, and 1406 are shown as balls. Ball 1402, ball 1404, and ball 1406 may visually grow larger and smaller in a proportionate manner as the corresponding balance component score increases or decreases or arm lengths can vary in length, shape, or composition to reflect scoring and achieve a similar effect in realizing the balance. The physics of the three-arm balance may be incarnated in multiple and varied forms.

Figure 21:
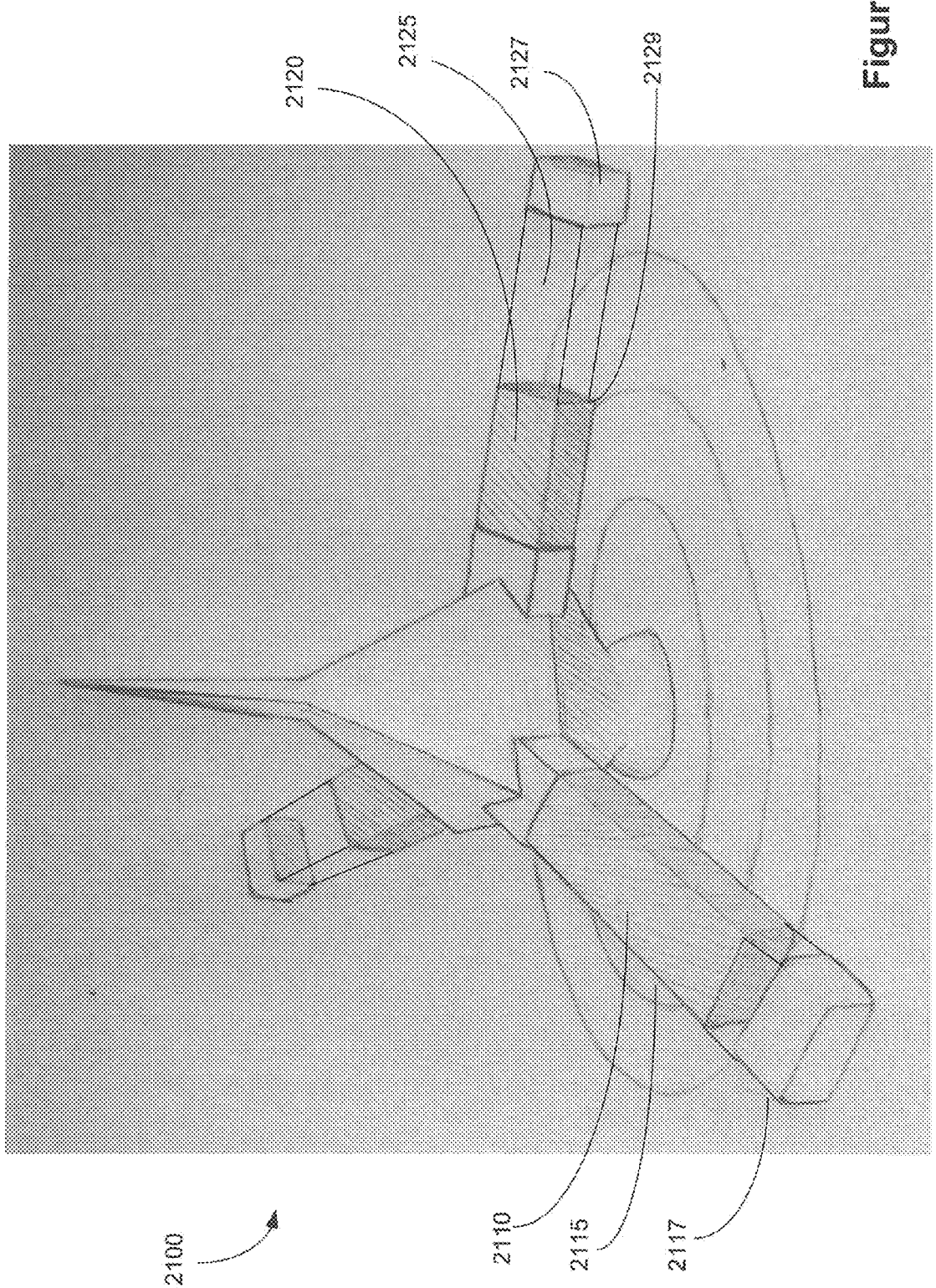
FIG. 21 displays an exemplary three-arm balance according to one or more disclosed embodiments of a financial health tool.

FIG. 21 is an exemplary embodiment of a three-arm balance 2100 wherein the arm length may vary and affect the tilt of the three-arm balance 2100. Shaded portion 2110 on balance arm 2115 and shaded portion 2120 of balance arm 2129 are of different lengths and therefore may influence the tilt of the balance in different ways. Blocks 2117 and 2127 may be considered as markers that may show a maximum length the shaded arm portions of the three-arm balance. A clear balance arm portion or space 2125 may be in between shaded arm portion 2120 and block 2127.

Three-arm balance 1400 may serve as a quick visual reference with regard to the financial health of a member. In an embodiment, three-arm balance 1400 may be in a physical form or a digital form with the same or similar elements as described herein. In an embodiment, a physical three-arm balance may communicate with a server using wired and/or wireless communication and serve as an actual physical/mechanical representation of financial health as described herein. In an embodiment, graphics and coordinate systems may be two dimensional, three dimensional, or more and may be used to display a member's financial health.

Figure 15A:
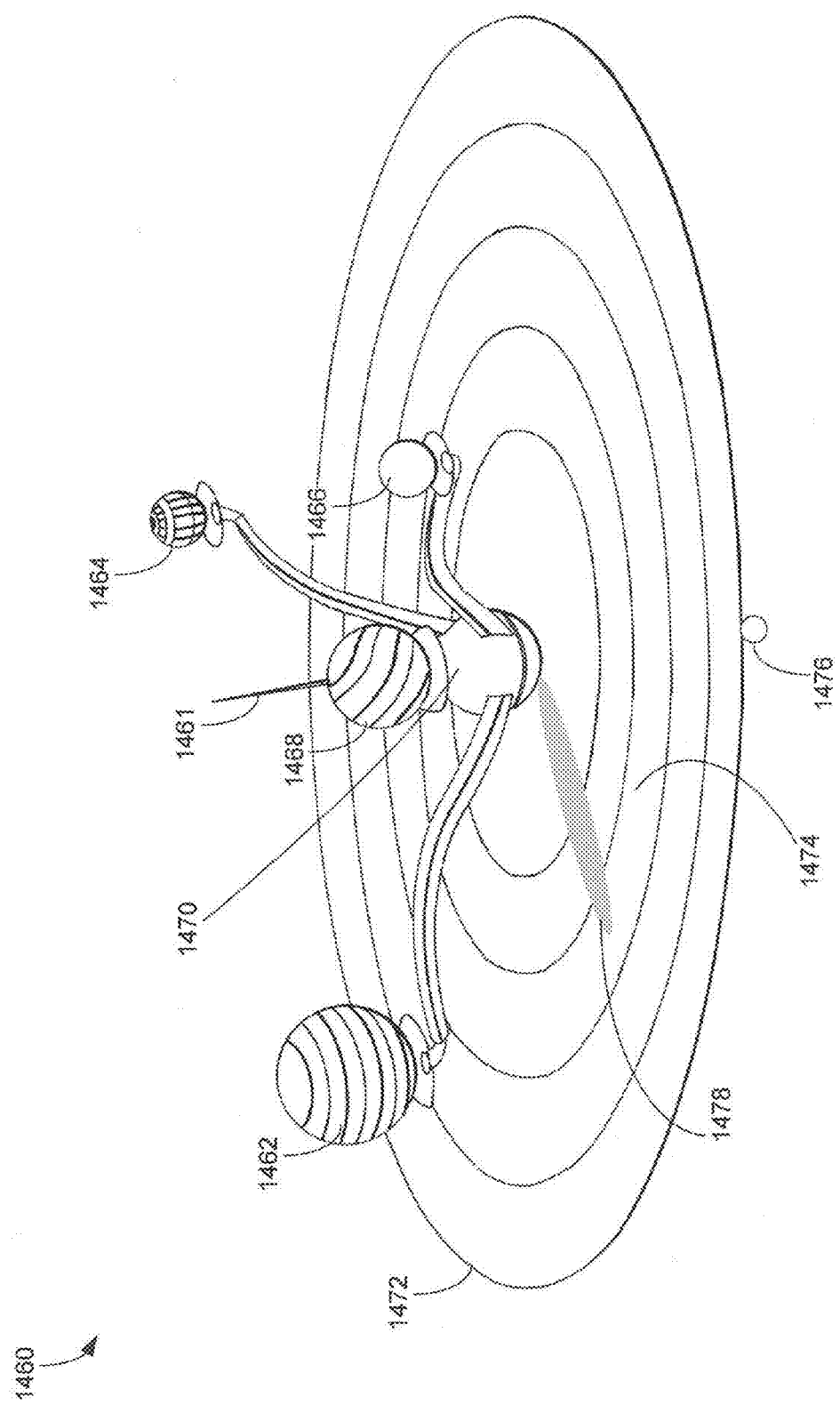
FIG. 15A displays a tilted front perspective view of an exemplary three-arm balance system according to one or more disclosed embodiments of a financial health tool.

FIG. 15A displays a perspective view of a three-arm balance system 1460. The three-arm balance system 1460 has a three-arm balance 1470 in conjunction with concentric circles 1472 that may be color coded (e.g., shades of green, yellow, and red) and labeled with grades (e.g., A, B, C, D, and F) to show how well a member's affairs are in balance, or where his particular strengths and weaknesses place him on the tilt plane and product/segment plane. There may be a spire 1461 (or other object) that protrudes from the center ball 1468 and may tilt as with the three-arm balance 1470. Center ball 1468 may represent a composite financial health score that is based on the arm based scores associated with balls 1462, 1464, and 1466. Ball 1462, 1464, 1466, and 1468 may grow larger or smaller based on the amount of the associated scores, as discussed in embodiments herein. Ball 1462, for example, may be a different shape in another embodiment (e.g., a square). In an embodiment, ball 1462 may have different patterns, colors, or other graphics based on the financial health of the member or member preference. For example, a green color with a smiling face may indicate a positive financial health while a red color with a frowning face may indicate a negative financial health.

In an embodiment, spire 1461 may cast a shadow or projection 1478 on the concentric circles based on the composite score. The length of shadow 1478 may be a composite indicator of overall financial health. For example, shadow 1478 may touch circle 1474, which may be yellow and may indicate a modestly negative financial health. In an embodiment, although balls 1462, 1464, and 1466, may have the same low score (e.g., 200 out of 1000), which on its face may indicate balance, there may be an overall low composite score (e.g., 198 out of 1000). The spire 1461 based on the composite score may lengthen considerably and may have a shadow that touches the edge of the concentric circles 1472, indicating a low composite score. Also, the length and associated "weight" of the spire 1461 may cause the three-arm balance 1470 to tilt. Three-arm balance 1470 may tilt in the direction of the ball (e.g., financial health leg) that reflects the member's greatest strengths. In another embodiment, the three-arm balance 1470 may tilt in the direction of the ball that the member shows the least strength. In an embodiment, when there is perfect or near perfect balance because of a high composite score (e.g., a score of 950), spire 1461 on the plane may be imperceptibly short.

Figure 15B:
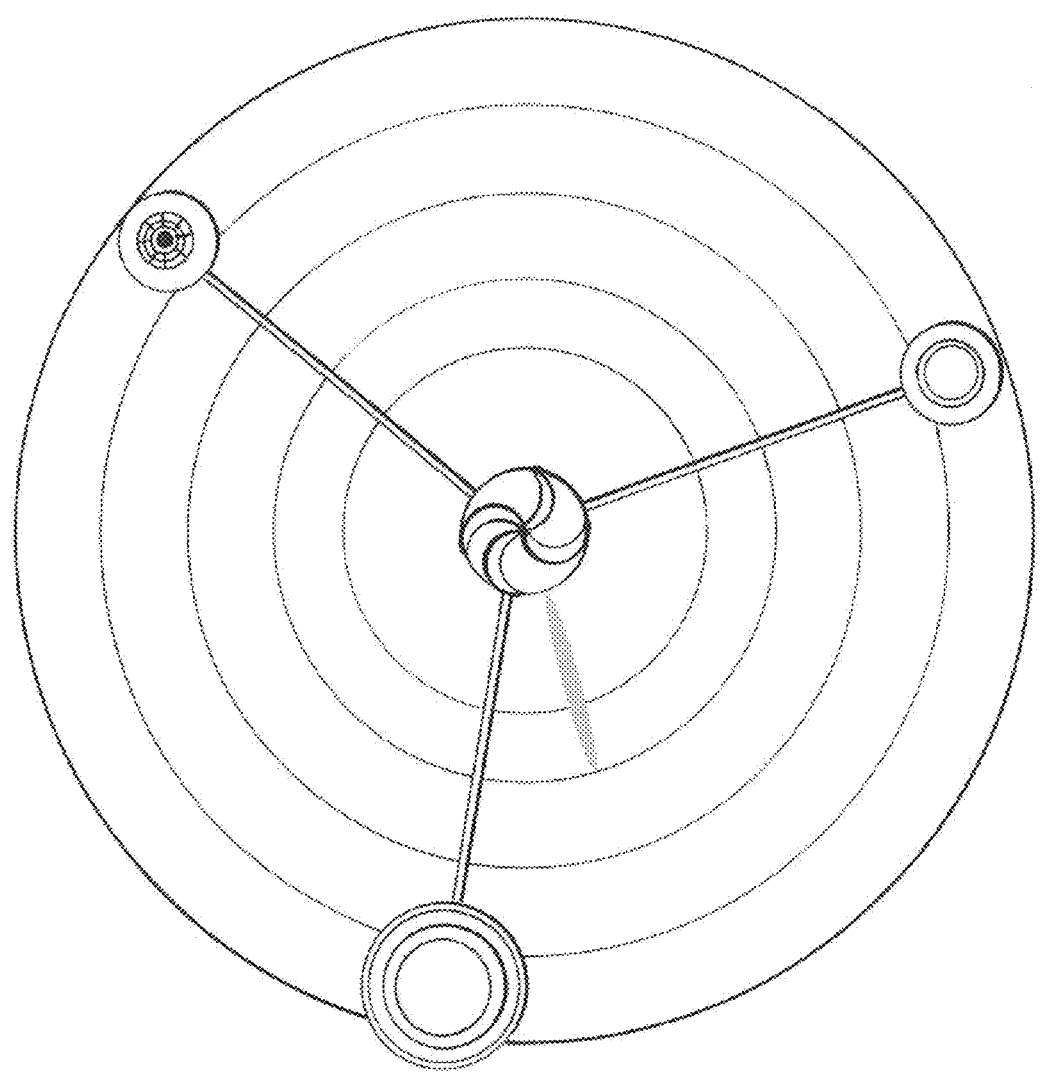
FIG. 15B displays a top-down view of an exemplary three-arm balance system according to one or more disclosed embodiments of a financial health tool.

Three-arm balance 1470 may rotate around the y-axis in space, similar to a globe or a merry-go-round. The rotation of three-arm balance 1470 may be clockwise or counterclockwise or the perspective of the viewer may also change under machine or user control. In an embodiment, once a balance arm of the three-arm balance crosses a plane during the rotation of the balance arm, for example a plane marked by point 1476, pertinent data regarding the balance arm (e.g., an Assets & Debts score of 300) may be displayed. In addition, objects 1466, 1468, 1462, and 1464 may individually rotate along their own independent y-axis as well. Their independent rate or direction of rotation may signal issues with financial health. FIG. 15B displays an embodiment of a top-down view of the three arm balance system shown in FIG. 15A. Although a three-arm balance is discussed herein, there may be more than three arms. Three arms may sufficiently and efficiently visually capture dimensions of personal finance that work together.

FIG. 16 displays an exemplary pricing and sign-up screen for an advertiser. The pricing and sign-up screen may display different available subscription levels. The pricing and sign-up screen shown may be used by advertisers to segment who they want to advertise to. The sign-up screen may allow advertisers to determine the level of services and functionality they desire. For example, as shown in FIG. 16, there may be an Enterprise level, a Business level 1502, a Professional level, and a Transactional level. Each level may carry different levels of customization and access to features. For example Business level 1502 may consist of features such as automated account setup, a number of alias mails and unique users, member management, and a highlighted directory level, among other things. While, for example, the Transactional level 1504 may consist of paying per inquiry and self-service maintenance, among other things. Different pricing plans to advertise on the financial tool may be presented based on whether the advertisement is pushed or pulled to the member account. This may assist in encouraging companies to advertise products that improve a member's financial health (e.g., services that may increase a member's composite financial health score).

Figure 17:
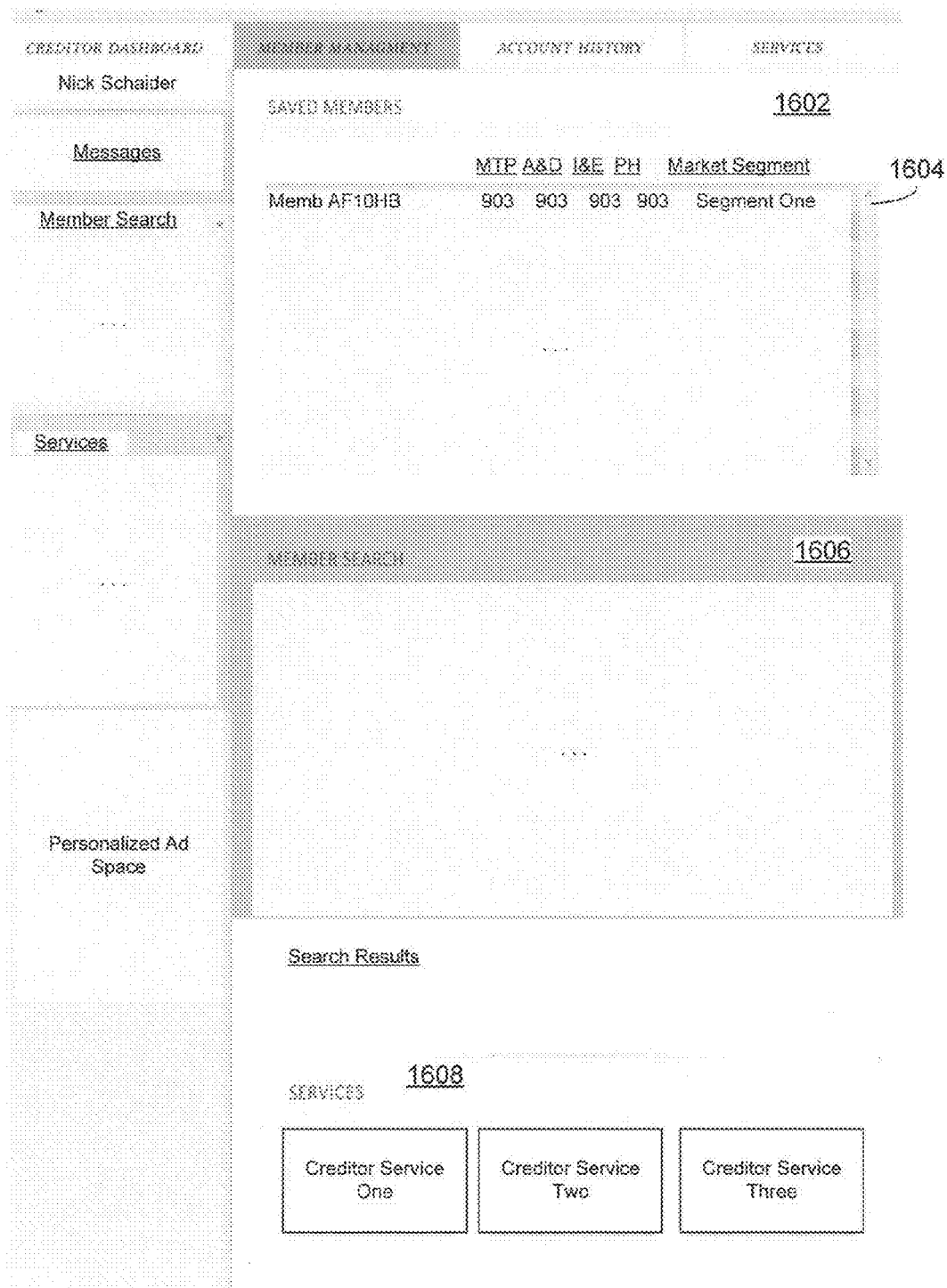
FIG. 17 displays an exemplary advertiser management search screen.

FIG. 17 displays an exemplary advertiser management search screen. There may be a saved members section 1602 which may list results from previous searches done by the advertiser. Advertisers may be able to identify a member by an anonymous string (alias) that preserves the member's Personally Identifiable Information (PII), while giving registered businesses sufficient information to identify, assess, and follow potential client-members (members have the ability to block particular vendors). For example, members who may have indicated interest in a service or product or whose financial characteristics may suggest they would benefit from a particular service or product. The members may be segmented into a particular market segment. For example, an advertiser may have previously done a search for members in market segment one. One of the results may be Member AF10HB 1604. Member AF10HB 1604 may be an alias for Elsa Buerger (a fictional member for illustration purposes) who may be listed under segment one and may have the scores as shown in FIG. 17. The advertiser may communicate with the member under her alias without knowing the true identity of the member. For example, the advertiser may not have access to a member's account number, name, social security number, among other things. The member may respond to e-mail solicitations without the advertiser knowing the member's identity until allowed by the member. The member may have the option to allow her identity to be known before or after any services have been rendered. An advertiser may communicate to a member via an e-mail messaging system to the member. In addition, the advertiser may receive proactive communications from the member in response to an advertisement on one of the member's financial health screens.

In FIG. 17 at 1606, there may be a member search section. The member search section may allow an advertiser to search for members based on particular criteria. The criteria may be the market segment of the member, the product interests of the member, the geographic regions, payment history score, among other things. There also may be a services section 1608. The services section may contain advertisements from the provider of the website. The services section may also contain requests for services that the advertiser may provide. For example, the advertiser may receive a request for bids from a member that may want the advertiser's product or service (e.g., the member may need a construction loan for 2% percent or less down with no fees).

Figure 18:
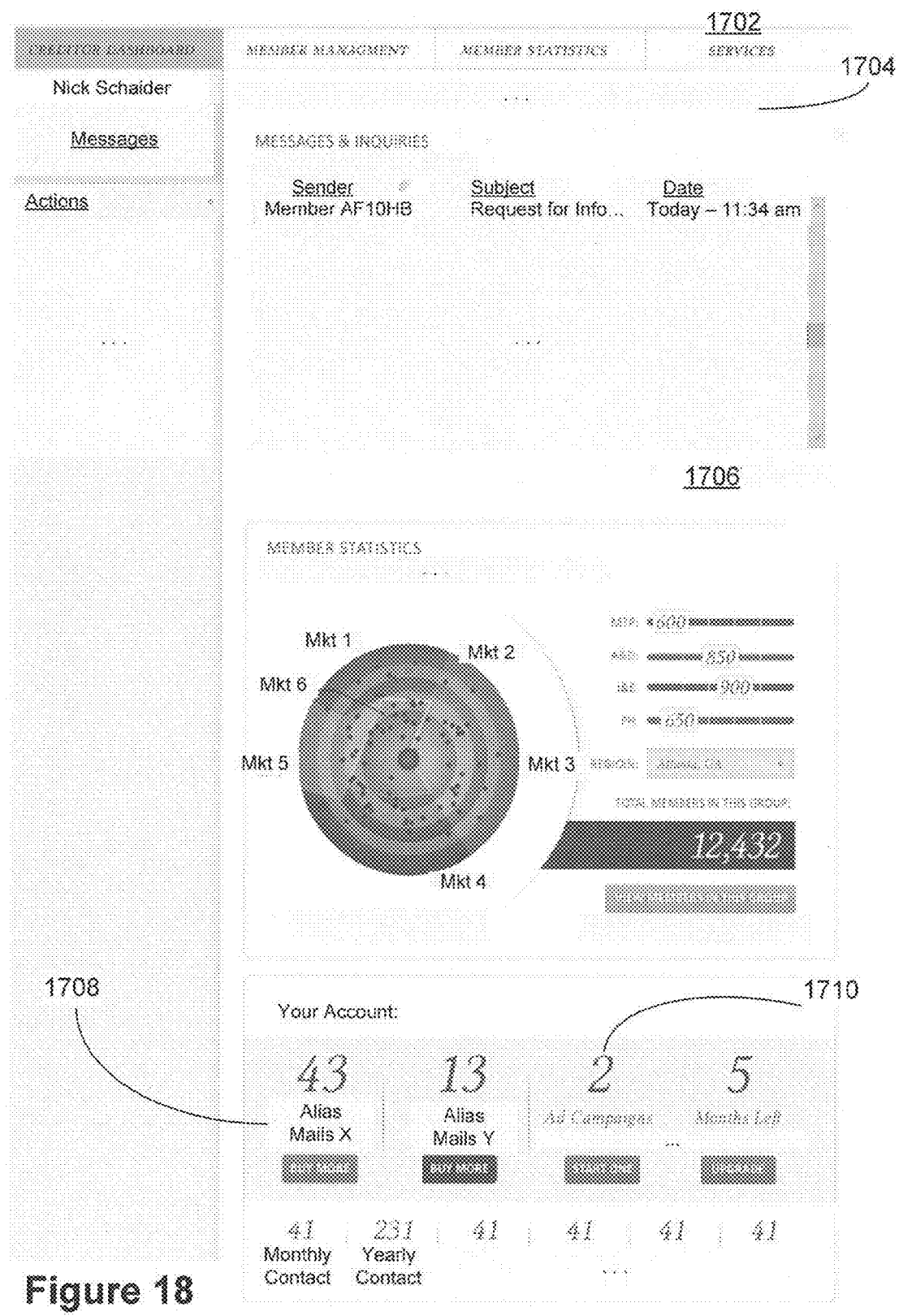
FIG. 18 displays an exemplary advertiser dashboard screen.

FIG. 18 displays an exemplary advertiser dashboard screen. There may be messages and inquires section at 1702 which may list communications with regard to advertisers direct alias e-mails or advertisements. There may be a member statistics section 1706. For example, the member statistics section 1706 may show financial health statistics for a particular city (e.g., Atlanta) and a graph of market segments. Market segments may be defined in different ways. For example, a market segment 1 may be a group of members who may have a profile that fits a need for a high yield long-term saving products (e.g., a 5 year 5 percent yield certificate of deposit), while a market segment 2 may be a group of members who may have a profile that fits a need for a prepaid debit card. Market segments may overlap.

In FIG. 18, at 1710 there may be a notification of the number of ad campaigns running. At 1708 there may be a notification of the number of alias mails an advertiser may have left. Alias mails may be used for alias direct e-mail or other direct messaging (e.g., text messaging or alias direct voice calls/messaging or direct "snail" mail) to a potential customer if a member allows and specifies forwarding, for example. The alias may be used to keep the identity of the member private until the member is ready to reveal the member's identity. Alias mails may be used to protect member privacy while allowing advertisers to assess a member's financial merits and behaviors without being able to personally identify the member. Alias mail may be restricted to a set amount over a period of time. The restriction may be in place so not to overburden members, among other reasons. In addition, a member may be able to restrict the number of alias mails that he receives (e.g., restrict a particular product/service and/or a particular company).

As shown in FIG. 18, an advertiser, for example, may search a market segment 1 and find over 12,000 matches. The advertiser may further refine its search to members with a financial health assets and debts score over 850. After further refinement the advertiser may have a list of 30 members that the advertiser may want to offer discounts to or invitations to an exclusive event. The advertiser may send an e-mail message, for example, via the financial health tool messaging system or use its own e-mail system to contact a member out of the selected group of 30. A member may receive the e-mail message and may reply through the financial health tool e-mail messaging system or the member's personal e-mail messaging system. If the reply e-mail is from the member's personal e-mail account then the e-mail may be routed through servers to translate the source address and to keep the identity of the member anonymous, if desired.

An alias mail identifier may change every so often. This may be triggered by the passage of time (e.g., once a month). The alias mail identifier may also be changed based on the number of times a member is contacted by a particular advertiser, a member manually changing the alias, a change of a member's market segment, a change of a member's financial health score, among other things. An advertiser may still be able to filter out a member which has already been contacted by the advertiser, a member who is already a customer of the advertiser, or other factors, even if the alias mail identifier has changed.

Figure 19:
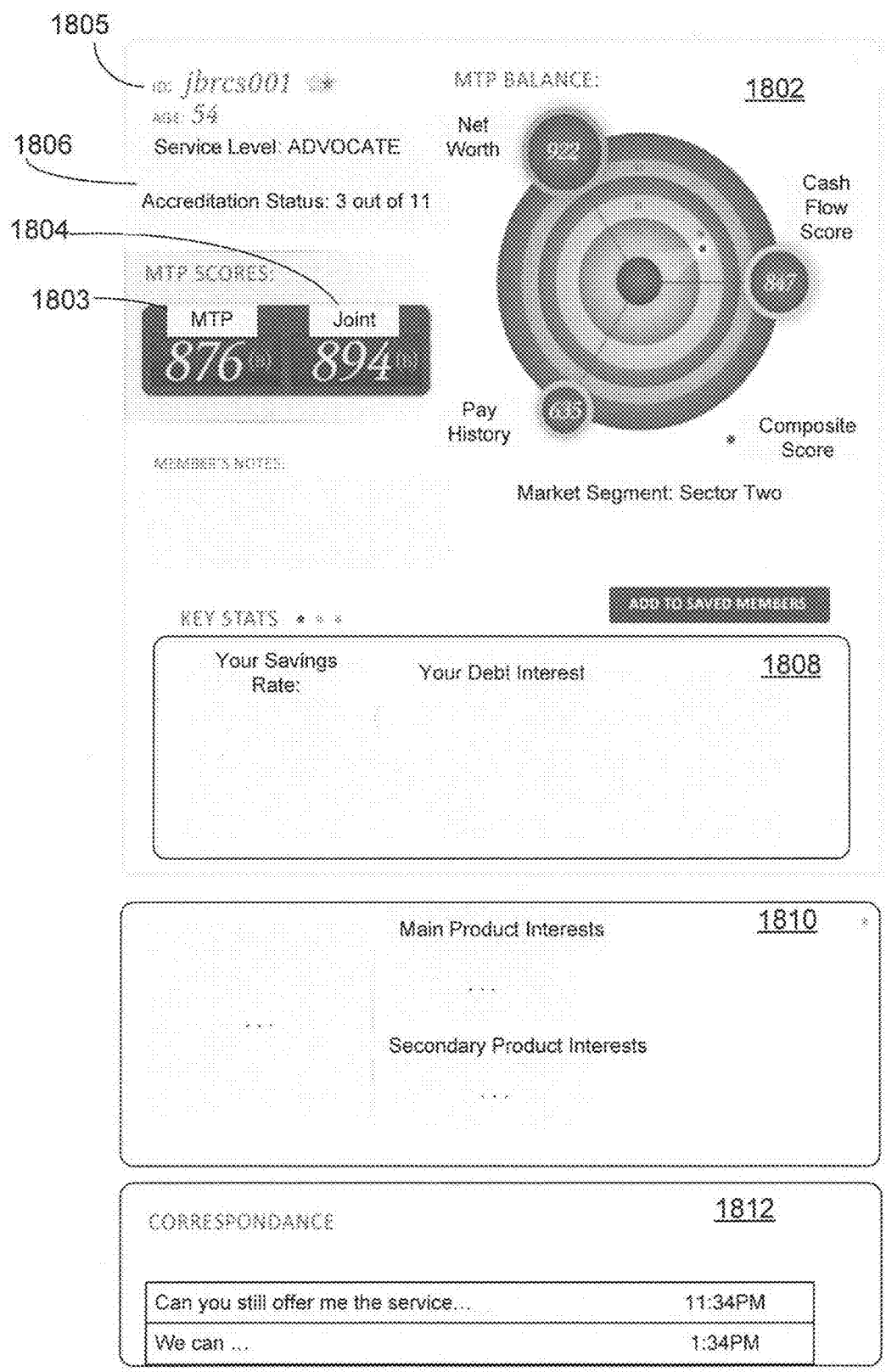
FIG. 19 displays an exemplary advertiser view of a member.

FIG. 19 displays an exemplary advertiser's view of a member. At 1802 there may be graphs and statics with regard to the member's financial balance scores, among other things. The member ID 1805 may be an alias of the member. There may be a composite score 1803 that may show the overall financial health/balance of the member. There also may be a composite joint financial health score 1804. The composite joint score 1804 may be a score that is based on the member's information along with another member's information (e.g., a spouse, parent, brother, aunt, business subsidiary, or other authorized member/members information). For example, Member1 may authorize Member2's profile to be factored in when creating a joint composite score for Member1. There may be an additional step of Member2 authorizing the use of her profile in Member1's composite joint score. The composite joint score of Member1 may be used by an advertiser to determine additional products or services that may be of interest to Member1 (or jointly to both Member1 and Member2) that an individual member may not qualify for alone or for products and services best suited to couples, families, or business joint ventures. Members may be able to limit information advertisers see in alias.

In FIG. 19, there may be an accreditation status 1806. An account may be considered accredited if the account goes through accreditation steps. An account may be accredited, for example, by pulling information directly from a bank or creditor's website. An account may be accredited by obtaining or verifying information from a credit rating agency or other trusted source to validate the accuracy and completeness of information. The accreditation status 1807 may be used to determine the amount of confidence given to a member's score.

In FIG. 19, there may be a key statistics section 1808 in which more details about a member, generally in the form of financial ratios and metrics: such as the debt allocation, and total available credit may be provided. The key statistics section may also provide a comparison of the advertiser's services and the services a member already has and/or the average in the market place. At 1810, the list of a member's product interests, and other applicable details, may be provided because of a product choice selected by the member, the member's purchasing habits, member's past solicitation of companies via the financial health tool, other habits when interacting with the financial health tool, and/or other information the financial health tool may have access to (e.g., credit card purchase records). At 1812, there may be a section which displays correspondence between the advertiser and a member, among other things.

Figure 20:
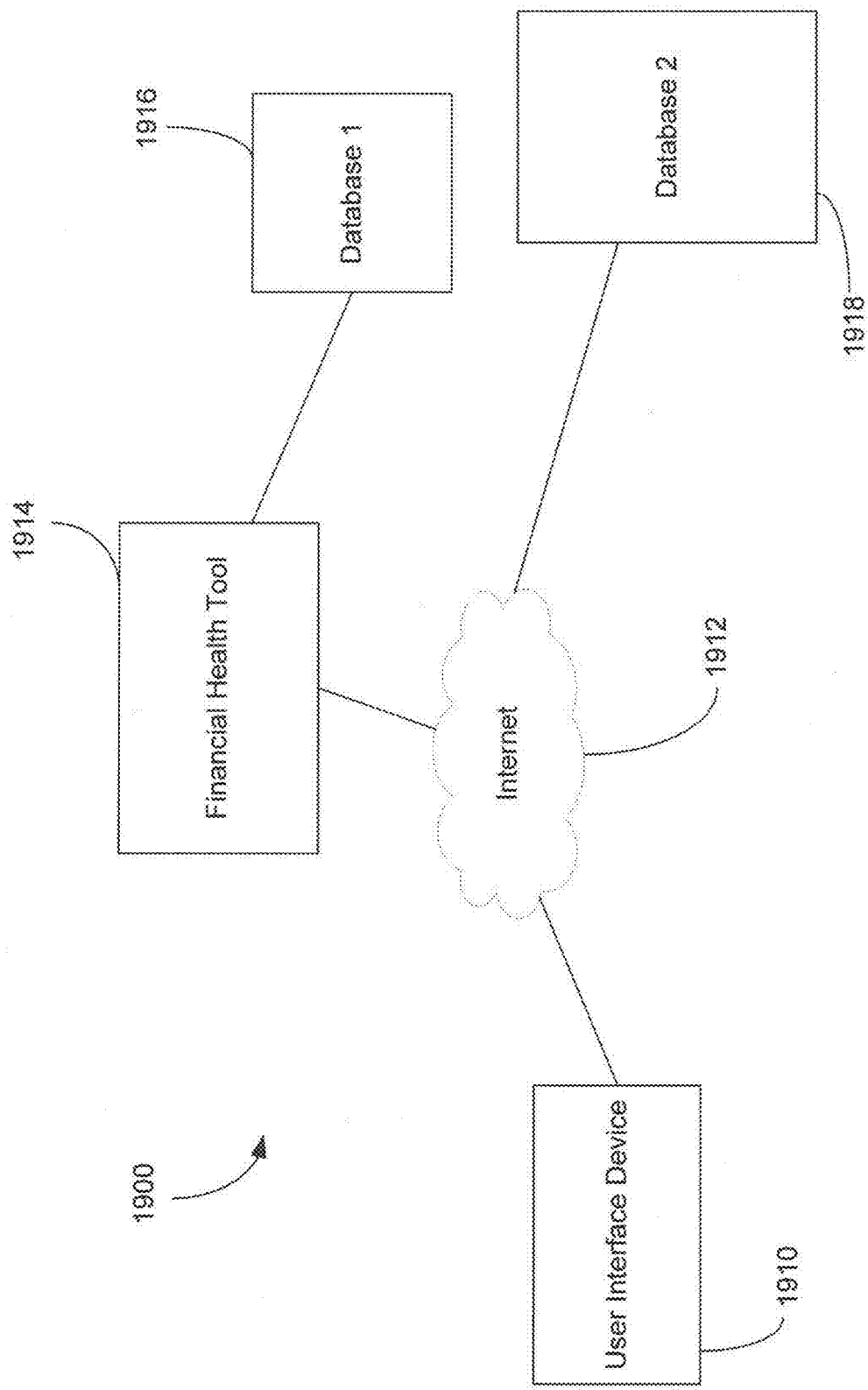
FIG. 20 is an exemplary illustration of a non-limiting network in which financial health tool services may be implemented.

FIG. 20 illustrates a non-limiting example of a network 1900 in which the present disclosure may be implemented. It should be understood that some elements have not been illustrated so as not to obscure the present disclosure. In one embodiment, a user interface device 1910 may interface through the internet 1912 to reach a financial health tool device 1914. The financial health tool may be used across the Internet using its established standards, browsers, and methods. A financial health tool device 1910 is illustratively defined as any device that may receive, store, or do any other computing functions that allow for the capability to do the functions of a financial health tool 1914 as described herein. The financial health tool device 1914 may interface with a local database 1916 or a remote database 1918 via network 1912. A financial health tool device 1914 may be one device or functionally be separated into several different devices. For example, the functions of a financial health tool device 1914 as described herein may be done on a local business network and/or within a user interface device (e.g., a mobile phone, a personal computer, or the like). In another embodiment, the functions of a financial health tool device 1914 may be embodied in a plurality of devices that are located in one or more locations.

In an embodiment, a member may use an user interface device 1910 to communicate with a financial health tool device 1914. The financial health tool device 1914 may pull information from a remote database 1918 which may contain the member's personal financial information. The personal information may be used to create financial health scores and other statistics and may be saved on a local, remote, or distributed database 1916.

Methods described herein may be performed by computing equipment or devices of any type, including mobile phones, servers, or any other device that may execute computing functions. The methods, apparatuses, and systems as described herein may be considered to create a new type of personal "balance" sheet that may assist people in becoming and/or staying financially healthy. It may be considered that the scoring model may promote sound financial decisions and show strengths and weaknesses. Steps to improve financial health may be identified and promptly displayed and matched with information, products, and services that may help member's reach financial health goals.

Although a financial health tool and other systems, apparatuses, and methods have been described in connection with the exemplary embodiments of the various figures, it is to be understood that other similar embodiments may be used or modifications and additions may be made to the described embodiments without deviating from the embodiments. Contemplated herein are applications to physical health and wellness, chemical reactions, business intelligence, and the like based on associated data of the respective applications. For example with regard to business intelligence, measurements of a business's territorial sales, financial health of clients, and debt may be similarly conveyed using a balance, as discussed herein. Another example may relate to physical health in the area of sleep. Sleep patterns such as length of non-interrupted sleep, rapid eye movement (REM) patterns and the number of times awaken during a sleep period may be recorded via an electronic device and conveyed via a balance, as similarly discussed herein, with regard to sleep and overall physical wellness. Figures may not be drawn to scale and may be viewed in conjunction with the detailed description. Although features and elements are described above in particular combinations, one of ordinary skill in the art will appreciate that each feature or element can be used alone or in any combination with the other features and elements. For instance, the methods and systems herein may be used for and between business entities, government entities, consumers, and the like. Therefore, the financial tools and other related elements as described herein should not be limited to any single embodiment, but rather should be construed in breadth and scope in accordance with the appended claims.

In describing preferred embodiments of the subject matter of the present disclosure, as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose.

What is claimed:

1. A financial management system comprising:
   a processor;
   a memory, coupled to the processor, having instructions that when executed by the processor cause the processor to:
   analyze data comprising financial data; and
   determine a set of financial metrics based on the analysis of the financial data, wherein the set of financial metrics comprises total available credit, net worth, cash flow, pay history, assets, and debts; and
   a display in communication with the processor configured to display a balance with at least three balance arms, wherein:
   the at least three balance arms represent at least one financial metric from the set of financial metrics;
   the balance has an orientation and an attribute;
   the orientation comprises an angle and a direction of a tilt of the balance;
   the attribute comprises at least one of: a shape, a size, a color, a rate of rotation, and patterns of the balance;
   the orientation changes by the angle and the direction of the tilt based on at least one financial metric from the set of financial metrics; and
   the attribute changes based on the at least one financial metric from the set of financial metrics.

2. The system of claim 1, wherein the display is further configured to display an object that protrudes from a substantially center point of the balance and has an attribute, and wherein the protruding object is manipulated so that the attribute of the protruding object changes based on a first financial metric from the set of financial metrics.

3. The system of claim 2, wherein the protruding object has a projection that is an indicator of the first financial metric from the set of financial metrics.

4. The system of claim 1, wherein the angle and the direction of the tilt of the balance is an indicator of a first financial metric from the set of financial metrics.

5. The system of claim 1, wherein the processor is further configured to manipulate an object near an end of a first balance arm of the at least three balance arms, wherein the object near the end of the first balance arm changes appearance based on a second financial metric from the set of financial metrics, and wherein the display is further configured to display the manipulated object.

6. A financial management method comprising the steps of:
   analyzing, by a processor, data comprising financial data;
   determining, by the processor, a set of financial metrics based on the analysis of the financial data, wherein the set of financial metrics comprises total available credit, net worth, cash flow, pay history, assets, and debts; and
   displaying, by the display coupled to the processor, a balance with at least three balance arms, wherein:
   the at least three balance arms represent at least one financial metric from the set of financial metrics;
   the balance has an orientation and an attribute;
   the orientation comprises an angle and a direction of a tilt of the balance;
   the attribute comprises at least one of: a shape, a size, a color, a rate of rotation, and patterns of the balance;
   the orientation changes by the angle and the direction of the tilt based on at least one financial metric from the set of financial metrics; and
   the attribute changes based on the at least one financial metric from the set of financial metrics.

7. The method of claim 6, further comprising:
   displaying an object that protrudes from a substantially center point of the balance and has an attribute; and
   manipulating the protruding object so that the attribute of the protruding object changes based on a first financial metric from the set of financial metrics.

8. The method of claim 7, wherein the protruding object has a projection that is an indicator of the first financial metric from the set of financial metrics.

9. The method of claim 6, wherein the angle and the direction of the tilt of the balance is an indicator of a first financial metric from the set of financial metrics.

10. The method of claim 6, further comprising:
    manipulating an object near an end of a first balance arm of the at least three balance arms, wherein the object near the end of the first balance arm changes appearance based on a second financial metric from the set of financial metrics; and
    displaying the manipulated object.

11. A non-transitory computer-readable medium containing instructions that cause a data processing system to perform a financial management method, the method comprising the steps of:

analyzing, on the processor, data comprising financial data;
determining a set of financial metrics based on the analysis of the financial data, wherein the set of financial metrics comprises total available credit, net worth, cash flow, pay history, assets, and debts; and
displaying a balance with at least three balance arms, wherein:
 the at least three balance arms represent at least one financial metric from the set of financial metrics;
 the balance has an orientation and an attribute;
 the orientation comprises an angle and a direction of a tilt of the balance;
 the attribute comprises at least one of: a shape, a size, a color, a rate of rotation, and patterns of the balance;
 the orientation changes by the angle and the direction of the tilt based on at least one financial metric from the set of financial metrics; and
 the attribute changes based on the at least one financial metric from the set of financial metrics.

12. The non-transitory computer-readable medium of claim 11, further comprising:
 displaying an object that protrudes from a substantially center point of the balance and has an attribute; and
 manipulating the protruding object so that the attribute of the protruding object changes based on the first financial metric from the set of financial metrics.

13. The non-transitory computer-readable medium of claim 12, wherein the protruding object has a projection that is an indicator of the first financial metric from the set of financial metrics.

14. The non-transitory computer-readable medium of claim 11, wherein the angle and the direction of the tilt of the balance is an indicator of a first financial metric from the set of financial metrics.

15. The non-transitory computer-readable medium of claim 11, further comprising:
 manipulating an object near an end of a first balance arm of the at least three balance arms, wherein the object near the end of the first balance arm changes appearance based on a second financial metric from the set of financial metrics; and
 displaying the manipulated object.

\* \* \* \* \*